(12) United States Patent
Park et al.

(10) Patent No.: US 11,086,042 B2
(45) Date of Patent: Aug. 10, 2021

(54) METHOD FOR DETECTING FOREIGN MATERIAL, AND APPARATUS AND SYSTEM THEREFOR

(71) Applicant: LG INNOTEK CO., LTD., Seoul (KR)

(72) Inventors: Jae Hee Park, Seoul (KR); Yong Il Kwon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 207 days.

(21) Appl. No.: 16/307,856

(22) PCT Filed: May 18, 2017

(86) PCT No.: PCT/KR2017/005147
§ 371 (c)(1),
(2) Date: Dec. 7, 2018

(87) PCT Pub. No.: WO2017/217663
PCT Pub. Date: Dec. 21, 2017

(65) Prior Publication Data
US 2019/0310388 A1 Oct. 10, 2019

(30) Foreign Application Priority Data

Jun. 13, 2016 (KR) .................. 10-2016-0073334
Jun. 14, 2016 (KR) .................. 10-2016-0073607

(51) Int. Cl.
*H02J 50/80* (2016.01)
*H02J 50/60* (2016.01)
(Continued)

(52) U.S. Cl.
CPC .............. *G01V 3/10* (2013.01); *G01N 27/20* (2013.01); *H02J 5/00* (2013.01); *H02J 7/02* (2013.01);
(Continued)

(58) Field of Classification Search
CPC .. G01V 3/10; H02J 50/80; H02J 50/60; H02J 5/00; H02J 7/02; G01N 27/20
(Continued)

(56) References Cited

U.S. PATENT DOCUMENTS 9,450,648 B2 * 9/2016 Bastami ............... H04B 5/0037
10,018,744 B2 * 7/2018 Roy ....................... H02J 7/025
(Continued)

FOREIGN PATENT DOCUMENTS

| KR | 10-2015-0059069 A | 5/2015 |
|----|-------------------|--------|
| WO | WO 2010/068062 A2 | 6/2010 |
| WO | WO 2012/091210 A1 | 7/2012 |
| WO | WO 2013/089311 A1 | 6/2013 |

*Primary Examiner* — Michael R. Fin
(74) *Attorney, Agent, or Firm* — Birch, Stewart, Kolasch & Birch, LLP

(57) ABSTRACT

The present invention relates to a method and an apparatus for detecting foreign material for wireless charging, and according to one embodiment of the present invention, a method by which a wireless power transmitter detects foreign material comprises the steps of: measuring the strength of a current inputted into an inverter in a ping step; receiving a packet including a receiver type identifier; determining a threshold value for detecting the foreign material corresponding to the receiver type identifier; and comparing the measured strength of current with the threshold value so as to determine whether the foreign material is present.

19 Claims, 27 Drawing Sheets

(51) Int. Cl.
  *H02J 7/02*   (2016.01)
  *H02J 5/00*   (2016.01)
  *G01V 3/10*   (2006.01)
  *G01N 27/20*  (2006.01)

(52) U.S. Cl.
  CPC ............ *H02J 50/60* (2016.02); *H02J 50/80* (2016.02); *H02J 5/005* (2013.01)

(58) Field of Classification Search
  USPC ........................................................ 307/104
  See application file for complete search history.

(56) References Cited

U.S. PATENT DOCUMENTS

| | | | |
|---|---|---|---|
| 2010/0109444 A1* | 5/2010 | Lemmens ............... | H02M 1/44 |
| | | | 307/104 |
| 2011/0140538 A1 | 6/2011 | Jung et al. | |
| 2013/0069441 A1 | 3/2013 | Verghese et al. | |
| 2013/0257168 A1* | 10/2013 | Singh ...................... | H02J 7/025 |
| | | | 307/104 |
| 2014/0191568 A1* | 7/2014 | Partovi ................... | H02J 7/025 |
| | | | 307/9.1 |
| 2014/0266036 A1* | 9/2014 | Jung ........................ | B60L 3/04 |
| | | | 320/108 |
| 2015/0263532 A1* | 9/2015 | Van Wageningen .... | H02J 50/80 |
| | | | 307/104 |
| 2016/0241086 A1 | 8/2016 | Jung et al. | |
| 2017/0018977 A1* | 1/2017 | Van Wageningen .... | H02J 50/12 |
| 2018/0337557 A1* | 11/2018 | Chen ................... | H02J 7/00045 |

\* cited by examiner

FIG. 10

| HEADER | PACKET TYPE | MESSAGE SIZE (BYTE) |
|---|---|---|
| 0x01 | Signal Strength | 1 |
| 0x02 | End Power Transfer | 1 |
| 0x06 | Power Control Hold-off | 1 |
| 0x51 | Configuration | 5 |
| 0x71 | Identification | 7 |
| 0x81 | Extended Identification | 8 |
| 0x07 | General Request | 1 |
| 0x20 | Specific Request | 2 |
| 0x22 | FOD Status | 2 |
| 0x03 | Control Error | 1 |
| 0x09 | Renegotiate | 1 |
| 0x31 | 24-bit Received Power | 3 |
| 0x04 | 8-bit Received Power | 1 |
| 0x05 | Charge Status | 1 |

FIG. 18

| RECEIVER TYPE IDENTIFIER [B7-B2] | CURRENT CHANGE THRESHOLD VALUE [UNIT: mA] |
|---|---|
| 000000 | 100 |
| 000001 | 200 |
| 000010 | 300 |
| 000011 | 400 |
| 000100 | 500 |
| 000101 | 600 |
| 000111 | 700 |
| 001000 | 800 |
| 001001 | 900 |
| 001010 | 1000 |
| ⋮ | ⋮ |
| 111110 | 6200 |
| 111111 | 6300 |

FIG. 19

| RECEIVER TYPE IDENTIFIER [B3-B2] | CURRENT CHANGE THRESHOLD RATIO [UNIT:%] |
|---|---|
| 00 | 30~50 |
| 01 | 50~70 |
| 10 | 70~90 |
| 11 | 90~110 |

METHOD FOR DETECTING FOREIGN MATERIAL, AND APPARATUS AND SYSTEM THEREFOR

CROSS REFERENCE TO RELATED APPLICATIONS

This application is the National Phase of PCT International Application No. PCT/KR2017/005147, filed on May 18, 2017, which claims priority under 35 U.S.C. 119(a) to Patent Application No. 10-2016-0073334, filed in the Republic of Korea on Jun. 13, 2016, and to Patent Application No. 10-2016-0073607, filed in the Republic of Korea on Jun. 14, 2016, all of which are hereby expressly incorporated by reference into the present application.

TECHNICAL FIELD

Embodiments relate to wireless power transmission technology and, more particularly, a method of detecting a foreign object in a wireless charging system, and an apparatus and system therefor.

BACKGROUND ART

Recently, as information and communication technology has been rapidly developed, a ubiquitous society based on information and communication technology is being developed.

In order to connect information communication devices anytime anywhere, recently, as information and communication technology has been rapidly developed, a ubiquitous society based on information and communication technology is being developed.

In order to connect information communication devices anytime anywhere, sensors equipped with a computer chip having a communication function should be installed in all social facilities. Accordingly, supplying power to such devices or sensors is a new challenge. In addition, as the types of mobile devices such as music players such as Bluetooth handsets or iPods as well as mobile phones have rapidly increased, it is necessary for users to take more time and efforts to charge batteries. As a method of solving such problems, wireless power transfer technology has recently attracted attention.

Wireless power transmission or wireless energy transfer refers to technology for wirelessly transmitting electric energy from a transmitter to a receiver using the magnetic induction principle. In 1800s, electric motors or transformers using the electromagnetic induction principle have begun to be used and, thereafter, attempts have been made to radiate electromagnetic waves such as high frequencies, microwaves and lasers to transfer electric energy. Frequently used electric toothbrushes or some wireless shavers are charged using the electromagnetic induction principle.

Up to now, a wireless energy transfer method may be roughly divided into a magnetic induction method, an electromagnetic resonance method and a radio frequency (RF) transmission method of a short-wavelength radio frequency.

The magnetic induction method uses a phenomenon that, when two coils are located adjacent to each other and then current is applied to one coil, a magnetic flux is generated to cause an electromotive force in the other coil, and is rapidly being commercialized in small devices such as mobile phones. The magnetic induction method may transfer power of up to several hundreds of kilowatts (kW) and has high efficiency. However, since a maximum transmission distance is 1 centimeter (cm) or less, a device to be charged should be located adjacent to a charger or the floor.

The electromagnetic resonance method uses an electric field or a magnetic field instead of using electromagnetic waves or current. The electromagnetic resonance method is rarely influenced by electromagnetic waves and thus is advantageously safe for other electronic devices or human bodies. In contrast, this method may be used in a limited distance and space and energy transmission efficiency is somewhat low.

The short-wavelength wireless power transmission method (briefly, referred to as the RF transmission method) takes advantage of the fact that energy may be directly transmitted and received in the form of a radio wave. This technology is a RF wireless power transmission method using a rectenna. The rectenna is a combination of an antenna and a rectifier and means an element for directly converting RF power into DC power. That is, the RF method is technology of converting AC radio waves into DC. Recently, as efficiency of the RF method has been improved, studies into commercialization of the RF method have been actively conducted Wireless power transmission technology may be used not only in mobile related industries but also in various industries such as IT, railroad and home appliance.

If a conductor which is not a wireless power receiver, that is, a foreign object (FO), is present in a wireless charging area, an electromagnetic signal received from a wireless power transmitter may be induced in the FO, thereby increasing in temperature. For example, the FO may include coins, clips, pins, and ballpoint pens.

If an FO is present between a wireless power receiver and a wireless power transmitter, wireless charging efficiency may be significantly lowered, and the temperatures of the wireless power receiver and the wireless power transmitter may increase due to increase in ambient temperature of the FO. If the FO located in the charging area is not removed, power waste may occur and the wireless power transmitter and the wireless power receiver may be damaged due to overheating.

Accordingly, detection of the FO located in the charging area is becoming an important issue in wireless charging technology.

DISCLOSURE

Technical Problem

Embodiments provide a method of detecting a foreign object for wireless charging, and an apparatus and system therefor.

Embodiments provide a wireless power transmission apparatus capable of more accurately detecting a foreign object, by adaptively calibrating reference quality factor accuracy based on a determination as to a possibility that a foreign object determined in a ping phase is present.

Embodiments provide a method of detecting a foreign object, which is capable of preventing non-detection of an FO, by adaptively determining a threshold value for FO detection based on a determination as to a possibility that a foreign object is present, and an apparatus and system therefor.

Embodiments provide a wireless power transmission apparatus capable of detecting a foreign object based on inverter input current change measured in a ping phase.

Embodiments provide a method of detecting a foreign object, which is capable of more accurately detecting the foreign object, by determining a current change threshold value or a threshold ratio for dynamically determining whether a foreign object is present based on a receiver type, and an apparatus and system therefor.

The technical problems solved by the embodiments are not limited to the above technical problems and other technical problems which are not described herein will become apparent to those skilled in the art from the following description.

Technical Solution

Embodiments provide a method of detecting a foreign object for wireless charging, and an apparatus and system therefor.

In an embodiment, a method of detecting a foreign object in a wireless power transmitter includes storing a quality factor value measured in a selection phase, determining a possibility that the foreign object is present in a ping phase, calibrating default reference quality factor accuracy upon determining that possibility that the foreign object is present is high, determining a quality factor threshold value for foreign object detection using the calibrated reference quality factor accuracy, and comparing the determined quality factor threshold value with the measured quality factor value to detect the foreign object.

The method may further include measuring a strength of transmitted current in the ping phase and comparing the measured strength of the transmitted current with a predetermined current reference value to determine the possibility that the foreign object is present.

In one embodiment, the strength of the transmitted current may be the strength of current input to an inverter provided in the wireless power transmission apparatus.

In another embodiment, the strength of the transmitted current may be the strength of current flowing in a transmission coil provided in the wireless power transmission apparatus.

In addition, upon determining that the possibility that the foreign object is present is high, the default reference quality factor accuracy may be calibrated to be decreased to a certain level.

In addition, upon determining that the possibility that the foreign object is present is low, the method may further include maintaining the default reference quality factor accuracy.

In addition, the method may further include receiving a foreign object detection status packet including a reference quality factor value in a negotiation phase, and the quality factor threshold value may be determined by applying the calibrated reference quality factor accuracy to the reference quality factor value.

In addition, the quality factor threshold value may be determined by further applying production and measurement tolerance for considering a design difference between transmitters to the reference quality factor value.

In addition, the production and measurement tolerance may be a constant determined based on at least one of a power class of the wireless power transmitter and the characteristics and arrangement structure of transmission coils installed in the wireless power transmitter.

If the foreign object is not detected as the result of comparison, an ACK packet may be transmitted to a wireless power receiver and then transitioning to a power transfer phase may be performed.

If the foreign object is detected as the result of comparison, a NACK packet may be transmitted to the wireless power receiver and then entry into the selection phase may be performed.

In addition, the method may further include determining whether the foreign object is removed based on the strength of the transmitted current measured in a state in which the foreign object is detected, and ping transmission may be delayed for a predetermined time upon determining that the detected foreign object is not removed.

In another embodiment, a foreign object detection apparatus includes a quality factor measurement unit configured to measure a quality factor value of a transmission coil in a selection phase, a sensing unit configured to measure a strength of transmitted current in a ping phase, and a controller configured to determine a possibility that the foreign object is present based on the measured strength of the transmitted current and configured to calibrate default reference quality factor accuracy upon determining that possibility that the foreign object is present is high, and the controller may determine a quality factor threshold value for foreign object detection using the calibrated reference quality factor accuracy.

In addition, the controller may determine that the possibility that the foreign object is present is high, if the measured strength of the transmitted current is less than a predetermined current reference value.

In addition, the foreign object detection apparatus further include a DC-to-DC converter configured to convert DC power received from a power supply into specific DC power and an inverter configured to convert the converted DC power into AC power, and the strength of the transmitted current may be the strength of current flowing between the DC-to-DC converter and the inverter.

In addition, the foreign object detection apparatus further include an LC resonant circuit including a resonant capacitor and an inductor for wirelessly transmitting AC power, and the strength of the transmitted current may be the strength of current flowing in the inductor.

In addition, upon determining that the possibility that the foreign object is present is high, the controller may calibrate the default reference quality factor accuracy to be decreased to a certain level.

In addition, upon determining that the possibility that the foreign object is present is low, the controller may further include maintaining the default reference quality factor accuracy.

In addition, the foreign object detection apparatus may further include a demodulator configured to receive a foreign object detection status packet including a reference quality factor value in a negotiation phase, and the controller may determine the quality factor threshold value by applying the calibrated reference quality factor accuracy to the reference quality factor value.

In addition, the quality factor threshold value may be determined by further applying production and measurement tolerance for considering a design difference between transmitters to the reference quality factor value.

In addition, the production and measurement tolerance may be a constant determined based on at least one of a power class of the wireless power transmitter and the characteristics and arrangement structure of transmission coils installed in the wireless power transmitter.

If the foreign object is not detected as the result of comparison, the controller may perform control to transmit an ACK packet to a wireless power receiver and to perform transitioning to a power transfer phase.

If the foreign object is detected as the result of comparison, the controller may perform control to transmit a NACK packet to the wireless power receiver and to perform entry into the selection phase.

In addition, the controller may perform control to determine whether the foreign object is removed based on the strength of the transmitted current measured in a state in which the foreign object is detected, and to delay ping transmission for a predetermined time upon determining that the detected foreign object is not removed.

According to another embodiment, a method of detecting a foreign object in a wireless power transmitter includes measuring a strength of current input to an inverter in a ping phase, receiving a packet including a receiver type identifier, determining a threshold value for foreign object detection corresponding to the receiver type identifier, and comparing the measured current strength with the threshold value to determine whether the foreign object is present.

In an embodiment, the receiver type identifier may be included and received in a configuration packet in a configuration and identification phase.

In another embodiment, the receiver type identifier may be included and received in a foreign object detection (FOD) status packet in a negotiation phase.

In addition, the method may further include outputting a predetermined notification signal indicating that the foreign object has been detected, upon determining that the foreign object is present, and may enter the selection phase after outputting the notification signal.

The method may enter a negotiation phase or a power transfer phase upon determining that the foreign object is not present.

The method may further include performing a foreign object detection procedure based on a quality factor value upon determining that the foreign object is present.

The method may further include transmitting a NACK packet to a wireless power receiver, upon determining that the foreign object is present through the foreign object detection procedure based on the quality factor value.

The method may further include transmitting an ACK packet to the wireless power receiver, upon determining that the foreign object is present through the foreign object detection procedure based on the quality factor value.

The method may further include receiving an FOD status packet in a negotiation phase and then transmitting an ACK packet to a wireless power receiver, upon determining that the foreign object is not present.

According to another embodiment, a method of detecting a foreign object in a wireless power transmitter includes calculating a change ratio of current input to an inverter in a ping phase, receiving a packet including a receiver type identifier, determining a current strength threshold ratio for foreign object detection corresponding to the receiver type identifier, and comparing the calculated current change ratio with the current strength threshold ratio to determine whether the foreign object is present.

The change ratio of the current input to the inverter may be calculated by a ratio of an initial inverter input current strength value in a state in which the object is not detected to an inverter input current strength value measured in the ping phase.

The determining of whether the foreign object is present may include determining that the foreign object is present, when the calculated current change ratio exceeds the current strength threshold ratio, and determining that the foreign object is not present, when the calculated current change ratio is less than or equal to the current strength threshold ratio.

In addition, the receiver type identifier may be included and received in a configuration packet in a configuration and identification phase.

In addition, the receiver type identifier may be included and received in a foreign object detection (FOD) status packet in a negotiation phase.

In addition, the method may further include outputting a predetermined notification signal indicating that the foreign object has been detected, upon determining that the foreign object is present, and may enter the selection phase after outputting the notification signal.

The method may further include entering a negotiation phase or a power transfer phase upon determining that the foreign object is not present.

According to another embodiment, a foreign object detection apparatus includes a sensing unit configured to measure a strength of current input to an inverter in a ping phase, a demodulator configured to receive a packet including a receiver type identifier, and a controller configured to determine a threshold value for foreign object detection corresponding to the receiver type identifier and to compare the measured current strength with the threshold value to determine whether the foreign object is present.

According to another embodiment, a foreign object detection apparatus includes a sensing unit configured to measure a strength of current input to an inverter in a ping phase, a demodulator configured to receive a packet including a receiver type identifier, and a controller configured to calculate a change ratio of the current input to the inverter in conjunction with the sensing unit, to determine a current strength threshold ratio for foreign object detection corresponding to the receiver type identifier, and to compare the calculated current change ratio with the current strength threshold ratio to determine whether the foreign object is present.

The foreign object detection apparatus may include a DC-to-DC converter configured to convert DC power received from a power supply into specific DC power and an inverter configured to convert the converted DC power into AC power, and the sensing unit may measure the strength of the current flowing between the DC-to-DC converter and the inverter.

In addition, the foreign object detection apparatus further include an LC resonant circuit including a resonant capacitor and an inductor for wirelessly transmitting AC power.

In another embodiment, a computer-readable recording medium having recorded thereon a program for executing any one of the above-described methods may be provided.

The aspects of the disclosure are only a part of the preferred embodiments of the disclosure, and various embodiments based on technical features of the disclosure may be devised and understood by the person with ordinary skill in the art based on the detailed description of the disclosure.

Advantageous Effects

The effects of the method, apparatus and system according to embodiments are as follows.

Embodiments provide a method of detecting a foreign object for wireless charging, and an apparatus and system therefor.

Embodiments provide a wireless power transmitter capable of more accurately detecting a foreign object.

Embodiments have an advantage of minimizing unnecessary power waste and a heating phenomenon due to a foreign object.

Embodiments provide a method of detecting a foreign object, which is capable of more accurately detecting the foreign object, by determining a threshold value for dynamically determining whether a foreign object is present based on a receiver type, and an apparatus and system therefor.

The effects of the disclosure are not limited to the above-described effects and other effects which are not described herein may be derived by those skilled in the art from the following description of the embodiments of the disclosure. That is, effects which are not intended by the disclosure may be derived by those skilled in the art from the embodiments of the disclosure.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 10 is a view illustrating the types of packets defined in the WPC (Qi) standard according to an embodiment;

FIG. 18 is a receiver type identifier mapping table in which a current change threshold value corresponding to a receiver type identifier is defined according to an embodiment;

FIG. 19 is a receiver type identifier mapping table in which a current change threshold ratio corresponding to a receiver type identifier is defined according to another embodiment;

BEST MODE

A

MODE FOR INVENTION

Figure 1:
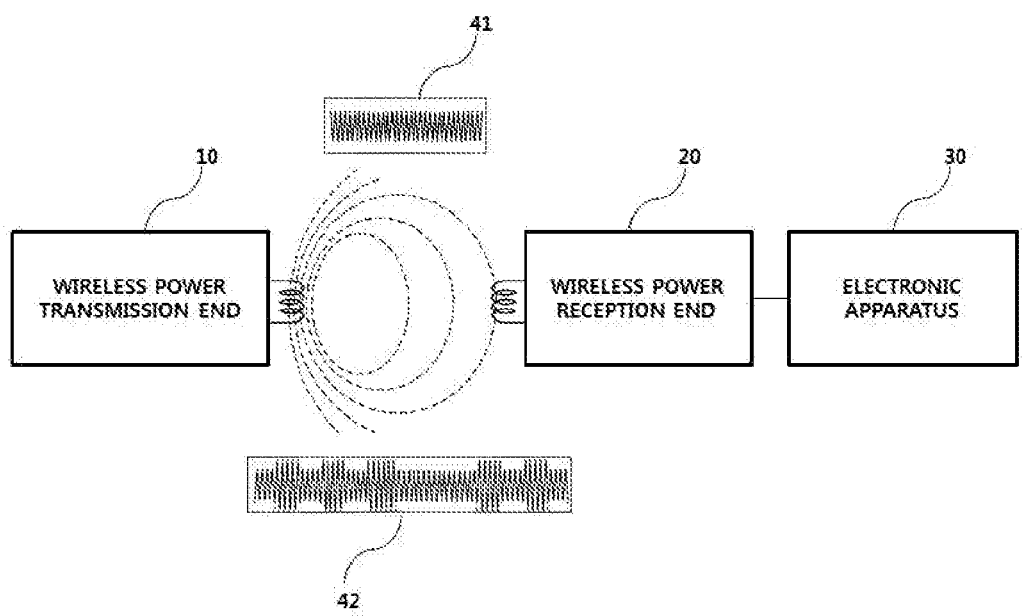
FIG. 1 is a block diagram illustrating a wireless charging system according to an embodiment.

Hereinafter, apparatuses and various methods according to embodiments will be described in detail with reference to the accompanying drawings. In general, a suffix such as "module" or "unit" may be used to refer to elements or components. Use of such a suffix herein is merely intended to facilitate description of the specification, and the suffix itself is not intended to have any special meaning or function.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In the description of embodiments, an apparatus having a function for transmitting wireless power in a wireless charging system may be used interchangeably with a wireless power transmitter, a wireless power transfer apparatus, a wireless electric power transfer apparatus, a wireless electric power transmitter, a transmission end, a transmitter, a transmission apparatus, a transmission side, a wireless power transfer apparatus, a wireless power tranferer, etc., for convenience of description. An apparatus having a function for receiving wireless power from a wireless power transfer apparatus may be used interchangeably with a wireless electric power reception apparatus, a wireless electric power receiver, a wireless power reception apparatus, a wireless power receiver, a reception terminal, a reception side, a reception apparatus, a receiver, etc.

The transmitter according to embodiment may be configured in the form of a pad, a cradle, an access point (AP), a small base station, a stand, a ceiling embedded structure or a wall-mounted structure. One transmitter may transfer power to a plurality of wireless power reception apparatuses. To this end, the transmitter may include at least one wireless power transfer means. Here, the wireless power transfer means may use various wireless power transfer standards based on an electromagnetic induction method of performing charging using the electromagnetic induction principle in which a magnetic field is generated in a power transfer-end coil and electricity is induced in a reception-end coil by the magnetic field. Here, the wireless power transfer means may include wireless charging technology of the electromagnetic induction method defined in the Wireless Power Consortium (WPC) and Power Matters Alliance (PMA) which are the wireless charging technology organizations.

In addition, a receiver according to an embodiment may include at least one wireless power reception means and may simultaneously receive wireless power from two or more transmitters. Here, the wireless power reception means may include wireless charging technology of the electromagnetic induction method defined in the Wireless Power Consortium (WPC) and Power Matters Alliance (PMA) which are the wireless charging technology organizations.

The receiver according to the embodiment may be used in a small electronic apparatus such as a mobile phone, a smartphone, a laptop, a digital broadcast terminal, a personal digital assistant (PDA), a portable multimedia player (PMP), a navigation system, an MP3 player, an electric toothbrush, an electronic tag, a lighting device, a remote controller, a fishing float, a wearable device such as a smart watch, etc. without being limited thereto, and may be used in any apparatus including wireless power reception means according to embodiment to charge a battery.

FIG. 1 is a block diagram illustrating a wireless charging system according to an embodiment.

Referring to FIG. 1, the wireless charging system roughly includes a wireless power transfer end 10 for wirelessly transmitting power, a wireless power reception end for receiving the transmitted power and an electronic apparatus 30 for receiving the received power.

For example, the wireless power transfer end 10 and the wireless power reception end 20 may perform in-band communication in which information is exchanged using the same frequency band as the operating frequency used for wireless power transfer. In another example, the wireless power transfer end 10 and the wireless power reception end 20 may perform out-of-band communication in which information is exchanged using the frequency band different from the operating frequency used for wireless power transfer.

For example, the information exchanged between the wireless power transfer end 10 and the wireless power reception end 20 may include status information of each other and control information. Here, the status information and the control information exchanged between the transmission end and the reception end will become more apparent through the following description of the embodiments.

In-band communication and out-of-communication may provide bidirectional communication, but the embodiments are not limited thereto. In another embodiment, in-band communication and out-of-communication may provide a unidirectional communication or half duplex communication.

For example, unidirectional communication may, but is not limited to, mean transmission of information from the wireless power reception end 20 to the wireless power transfer end 10 or transmission from the wireless power transfer end 10 to the wireless power reception end 20.

The half duplex communication method is characterized in that bidirectional communication between the wireless power reception end 20 and the wireless power transfer end 10 is enabled but information can be transmitted only by one device at a certain point in time.

The wireless power reception end 20 according to the embodiment may acquire a variety of status information of the electronic apparatus 30. For example, the status information of the electronic apparatus 30 may include, but is not limited to, current power usage information, current power usage information, information for identifying an executed application, CPU usage information, battery charge status information, battery output voltage/current information, etc. and may include information capable of being acquired from the electronic apparatus 30 and being used for wireless power control.

In particular, the wireless power transfer end 10 according to the embodiment may transmit a predetermined packet indicating whether fast charging is supported to the wireless power reception end 20. The wireless power reception end 20 may inform the electronic apparatus 30 that the wireless power transfer end 10 supports the fast charging mode, upon determining that the wireless power transfer end 10 supports the fast charging mode. The electronic apparatus 30 may display information indicating that fast charging is possible through a predetermined display means, for example, a liquid crystal display.

In addition, the user of the electronic apparatus 30 may select a predetermined fast charging request button displayed on the liquid crystal display means and control the wireless power transmission end 10 to operate in the fast charging mode. In this case, when the user selects the fast charging request button, the electronic apparatus 30 may transmit a predetermined fast charging request signal to the wireless power reception end 20. The wireless power reception end 20 may generate and transmit a charging mode packet corresponding to the received fast charging request signal to the wireless power transmission end 10, thereby switching a normal low-power charging mode to the fast charging mode.

Figure 2:
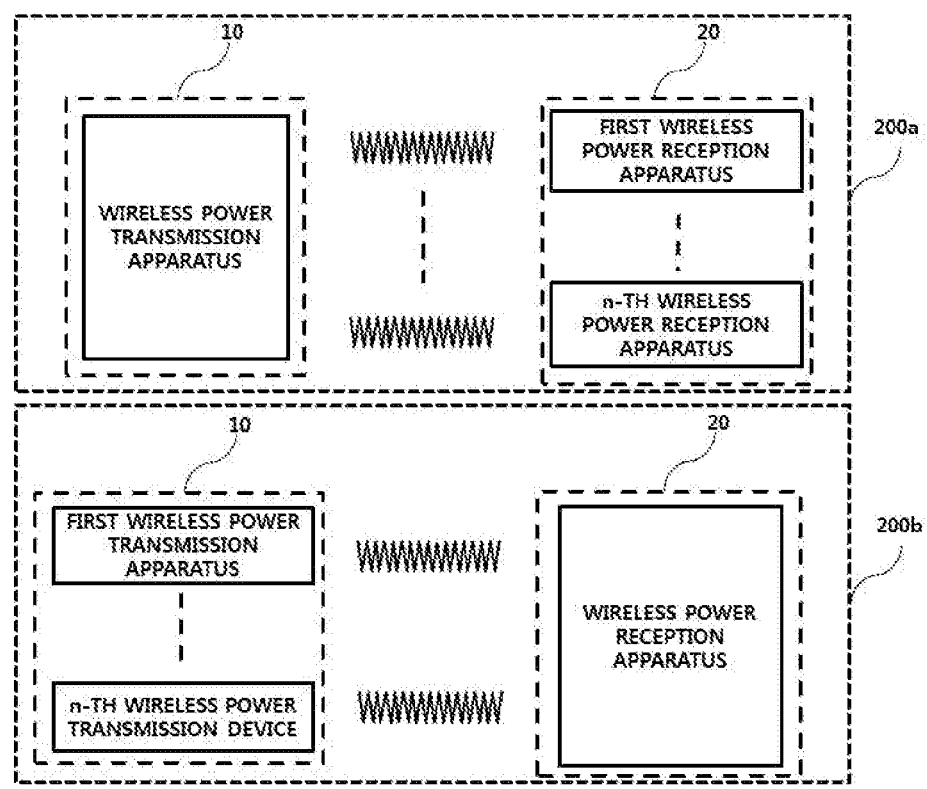
FIG. 2 is a block diagram illustrating a wireless charging system according to another embodiment.

FIG. 2 is a block diagram illustrating a wireless charging system according to another embodiment.

For example, as denoted by reference numeral 200a, the wireless power reception end 20 may include a plurality of wireless power reception apparatuses, which are connected to one wireless power transfer end 10 to perform wireless charging. At this time, the wireless power transfer end 10 may divide and transfer power to the plurality of wireless power reception apparatuses in a time-divisional manner but is not limited thereto. In another example, the wireless power transfer end 10 may divide and transfer power to the plurality of wireless power reception apparatus using different frequency bands respectively allocated to the wireless power reception apparatuses.

At this time, the number of wireless power reception apparatuses connectable to one wireless power transfer apparatus 10 may be adaptively determined based on at least one of the required power amount of each wireless power reception apparatus, a battery charge state, power consumption of the electronic apparatus and available power amount of the wireless power transfer apparatus.

In another example, as denoted by reference numeral 200b, the wireless power transfer end 10 may include a plurality of wireless power transfer apparatuses. In this case, the wireless power reception end 20 may be simultaneously connected to the plurality of wireless power transfer apparatuses and may simultaneously receive power from the connected wireless power transfer apparatuses to perform charging. At this time, the number of wireless power transfer apparatuses connected to the wireless power reception end 20 may be adaptively determined based on the required power amount of the wireless power reception end 20, a battery charge state, power consumption of the electronic apparatus, and available power amount of the wireless power transfer apparatus.

Figure 3:
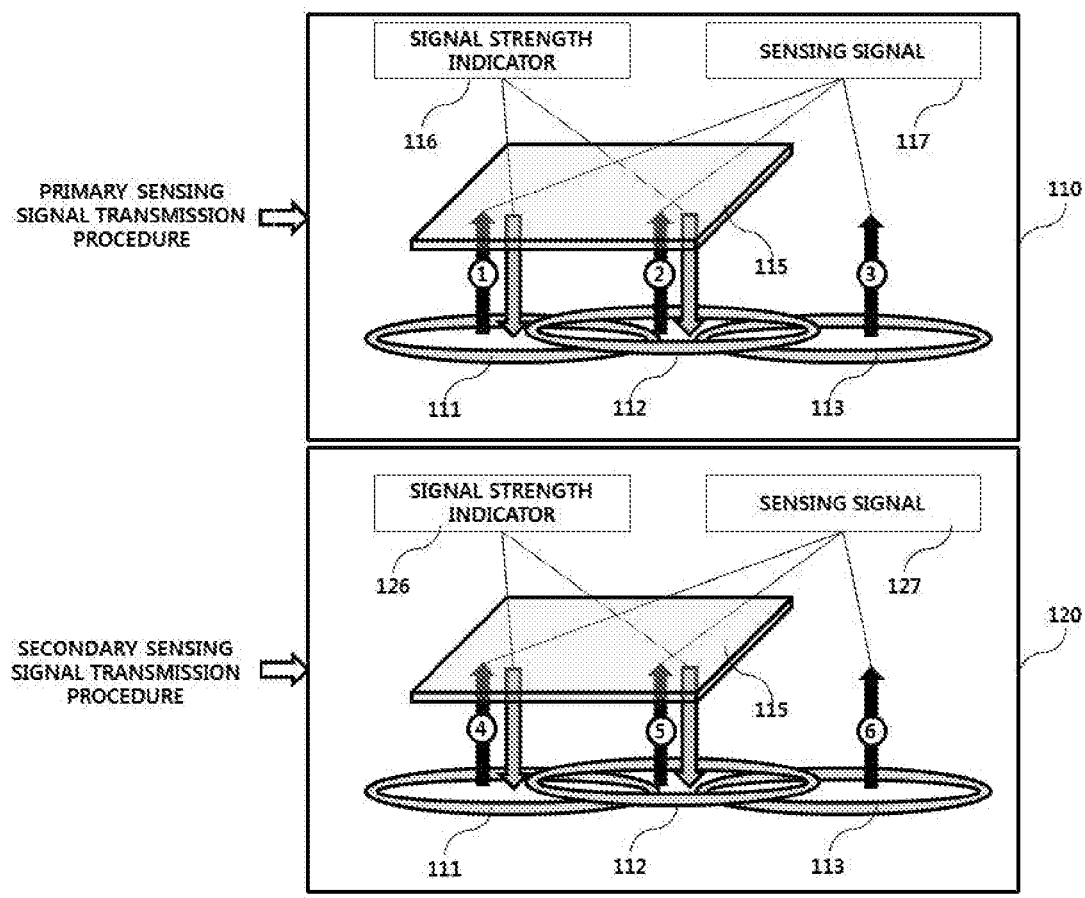
FIG. 3 is a diagram illustrating a procedure for transmitting a sensing signal in a wireless charging system according to an embodiment.

FIG. 3 is a diagram illustrating a procedure for sensing a wireless power receiver in a wireless charging system according to an embodiment.

For example, a wireless power transmitter may include three transmission coils 111, 112 and 113. Each transmission coil may partially overlap another transmission coil and the wireless power transmitter sequentially transmits predetermined sensing signals 117 and 127 for sensing presence of a wireless power receiver through each transmission coil, for example, digital ping signals, in a predefined order.

As shown in FIG. 3, the wireless power transmitter may sequentially transmit the sensing signal 117 through a primary sensing signal transmission procedure denoted by reference numeral 110 and identify the transmission coils 111 and 112 for receiving a signal strength indicator 116 from the wireless power receiver 115. Subsequently, the wireless power transmitter may sequentially transmit the sensing signal 127 through a secondary sensing signal transmission procedure denoted by reference numeral 120, identify a transmission coil having good power transfer efficiency (or charging efficiency), that is, good alignment state between the transmission coil and the reception coil, between the transmission coils 111 and 112 for receiving the signal strength indicator 126, and perform control to transfer power through the identified transmission coil, that is, perform wireless charging.

As shown in FIG. 3, the wireless power transmits the two sensing signal transmission procedures in order to more accurately determine in which transmission coil the reception coil of the wireless power receiver is well aligned.

As denoted by reference numerals 110 and 120 of FIG. 3, if the signal strength indicators 116 and 126 are received in the first transmission coil 111 and the second transmission coil 112, the wireless power transmitter selects a best aligned transmission coil based on the signal strength indicator 126 received in the first transmission coil 111 and the second transmission coil 112 and performs wireless charging using the selected transmission coil.

Figure 4:
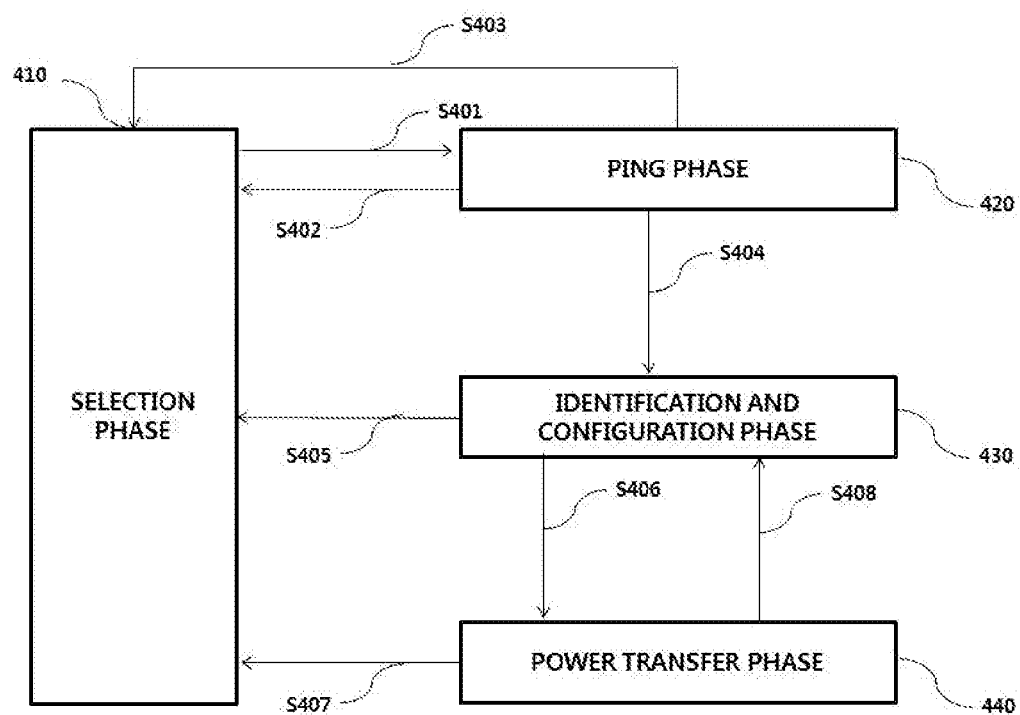
FIG. 4 is a state transition diagram explaining a wireless power transfer procedure defined in the WPC standard.

FIG. 4 is a state transition diagram explaining a wireless power transfer procedure defined in the WPC standard.

Referring to FIG. 4, power transfer from the transmitter to the receiver according to the WPC standard may be roughly divided into a selection phase 410, a ping phase 420, an identification and configuration phase 430 and a power transfer phase 440.

The selection phase 410 may transition when power transfer starts or when a specific error or a specific event is sensed while power transfer is maintained. The specific error and the specific event will become apparent from the following description. In addition, in the selection phase 410, the transmitter may monitor whether an object is present on an interface surface. When it is sensed that the object is present on the interface surface, the transmitter may transition to the ping step 420 (S401). In the selection phase 410, the transmitter transmits an analog ping signal having a very short pulse and sense whether an object is present in an active area of the interface surface based on change in current of the transmission coil.

In the ping step 420, when the object is sensed, the transmitter activates the receiver and transmits a digital ping for identifying whether the receiver is compatible with the WPC standard. In the ping step 420, when a response signal to the digital ping, for example, a signal strength indicator, is not received from the receiver, the transmitter may transition to the selection phase 410 again (S402). In addition, in the ping phase 420, when a signal indicating that power transfer has been terminated, that is, charging termination signal, is received from the receiver, the transmitter may transition to the selection phase 410 (S403).

If the ping phase 420 is finished, the transmitter may transition to the identification and configuration phase 430 for identifying the receiver and collecting the reception configuration and status information (S404).

In the identification and configuration phase 430, when an unexpected packet is received, when an expected packet is not received during a predetermined time (timeout), when a packet transmission error occurs, or when power transfer contract is not established (no power transfer contract), the transmitter may transition to the selection phase 410 (S405).

When identification and configuration of the receiver is finished, the transmitter may transition to the power transfer phase 440 for transmitting wireless power (S406).

In the power transfer phase 440, when an unexpected packet is received, when an expected packet is not received during a predetermined time (timeout), when predetermined power transfer contract violation occurs, or when charging is terminated, the transmitter may transition to the selection phase 410 (S407).

In addition, in the power transfer phase 440, when the power transfer contract needs to be reconfigured according to transmitter state change, the transmitter may transition to the identification and configuration phase 430 (S408).

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 5:
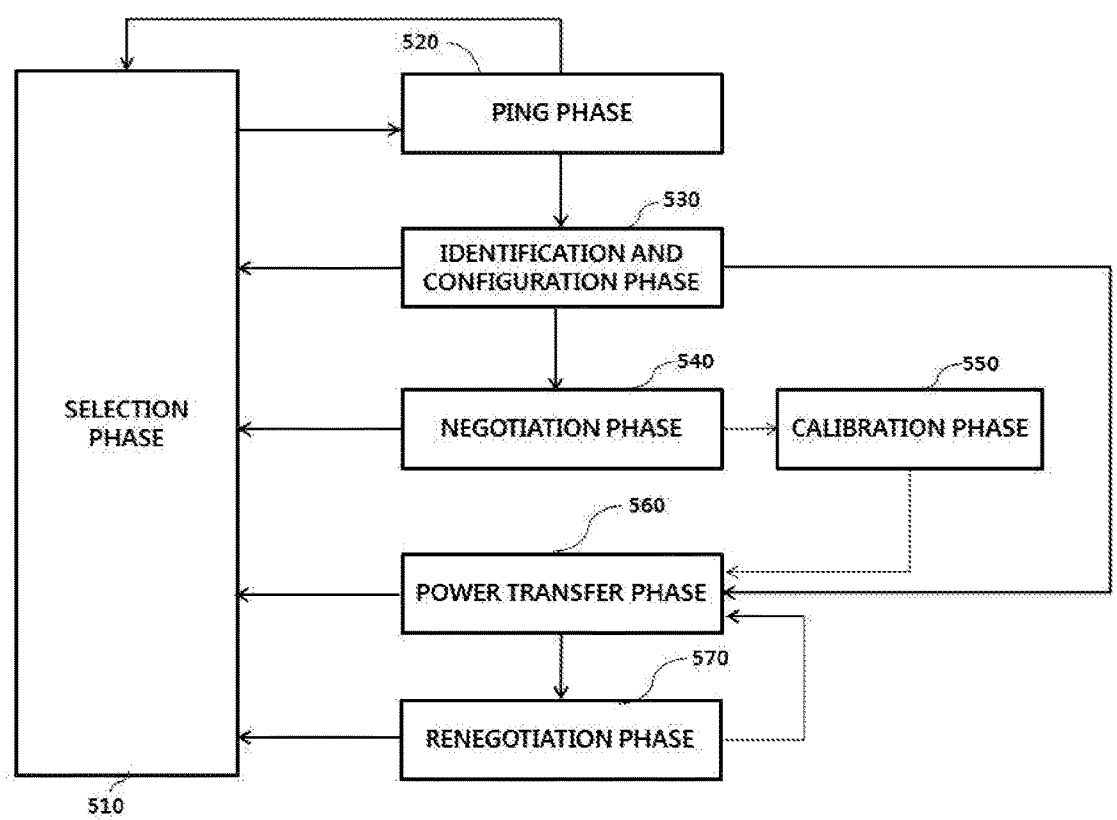
FIG. 5 is a state transition diagram explaining a wireless power transfer procedure defined in the WPC (Qi) standard.

FIG. 5 is a state transition diagram explaining a wireless power transfer procedure defined in the WPC (Qi) standard.

Referring to FIG. 5, power transfer from the transmitter to the receiver according to the WPC (Qi) standard may be roughly divided into a selection phase 510, a ping phase, 520, an identification and configuration phase 530, a negotiation phase 540, a calibration phase 550, a power transfer phase 560 and a renegotiation phase 570.

The selection phase 510 may transition when power transfer starts or when a specific error or a specific event is sensed while power transfer is maintained. The specific error and the specific event will become apparent from the following description. In addition, in the selection phase 510, the transmitter may monitor whether an object is present on an interface surface. When it is sensed that the object is present on the interface surface, the transmitter may transition to the ping step 520. In the selection phase 510, the transmitter transmits an analog ping signal having a very short pulse and senses whether an object is present in an active area of the interface surface based on change in current of a transmission coil or a primary coil.

In the ping step 520, when the object is sensed, the transmitter activates the receiver and transmits a digital ping for identifying whether the receiver is compatible with the WPC standard. In the ping step 520, when a response signal to the digital ping, for example, a signal strength packet, is not received from the receiver, the transmitter may transition to the selection phase 510 again. In addition, in the ping phase 520, when a signal indicating that power transfer has been terminated, that is, a charging termination packet, is received from the receiver, the transmitter may transition to the selection phase 510.

If the ping phase 520 is finished, the transmitter may transition to the identification and configuration phase 530 for identifying the receiver and collecting the configuration and status information of the receiver.

In the identification and configuration phase 530, when an unexpected packet is received, when an expected packet is not received during a predetermined time (timeout), when a packet transmission error occurs, or when power transfer contract is not established (no power transfer contract), the transmitter may transition to the selection phase 510.

The transmitter may determine whether entry into the negotiation phase 540 is necessary based on the negotiation field value of the configuration packet received in the identification and configuration phase 530.

Upon determining that negotiation is necessary, the transmitter may transition to the negotiation phase 540 to perform a predetermined FOD procedure.

In contrast, upon determining that negotiation is not necessary, the transmitter may immediately transition to the power transfer phase 560.

In the negotiation phase 540, the transmitter may receive a foreign object detection (FOD) status packet including a reference quality factor value. At this time, the transmitter may determine a threshold value for FO detection based on the reference quality factor value.

Various methods of, at the transmitter, determining the threshold value for FO detection based on the reference quality factor value will be described in detail with reference to drawings.

The transmitter may detect whether the FO is present in the charging using the determined threshold value and the currently measured quality factor value and control power transfer according to the FO detection result.

For example, when the FO is detected, the transmitter may return to the selection phase 510. In contrast, when the FO is not detected, the transmitter may transition to the power transfer phase 560 through the calibration phase 550. Specifically, when the FO is not detected, the transmitter may measure power loss in the reception end and the transmission end, in order to determine the strength of the power received by the reception end and to determine the strength of the power transmitted by the transmission end in the calibration phase 550. That is, the transmitter may predict power loss based on a difference between the transmission power of the transmission end and the reception power of the reception end in the calibration phase 550. The transmitter according to one embodiment may calibrate the threshold value for FOD using the predicted power loss.

In the power transfer phase 560, when an unexpected packet is received, when an expected packet is not received during a predetermined time (timeout), when power transfer contract violation occurs or when charging is finished, the transmitter may transition to the selection phase 510.

In addition, in the power transfer phase 560, if power transfer contract needs to be reconfigured according to transmitter status change, etc., the transmitter may transition to the renegotiation phase 570. At this time, when renegotiation is normally finished, the transmitter may return to the power transfer phase 560.

The power transfer contract may be configured based on the transmitter and receiver status information and characteristic information. For example, the transmitter status information may include information on the maximum amount of transmittable power, information on the maximum number of receivable receivers, etc. and the receiver status information may include information on required power.

Figure 6:
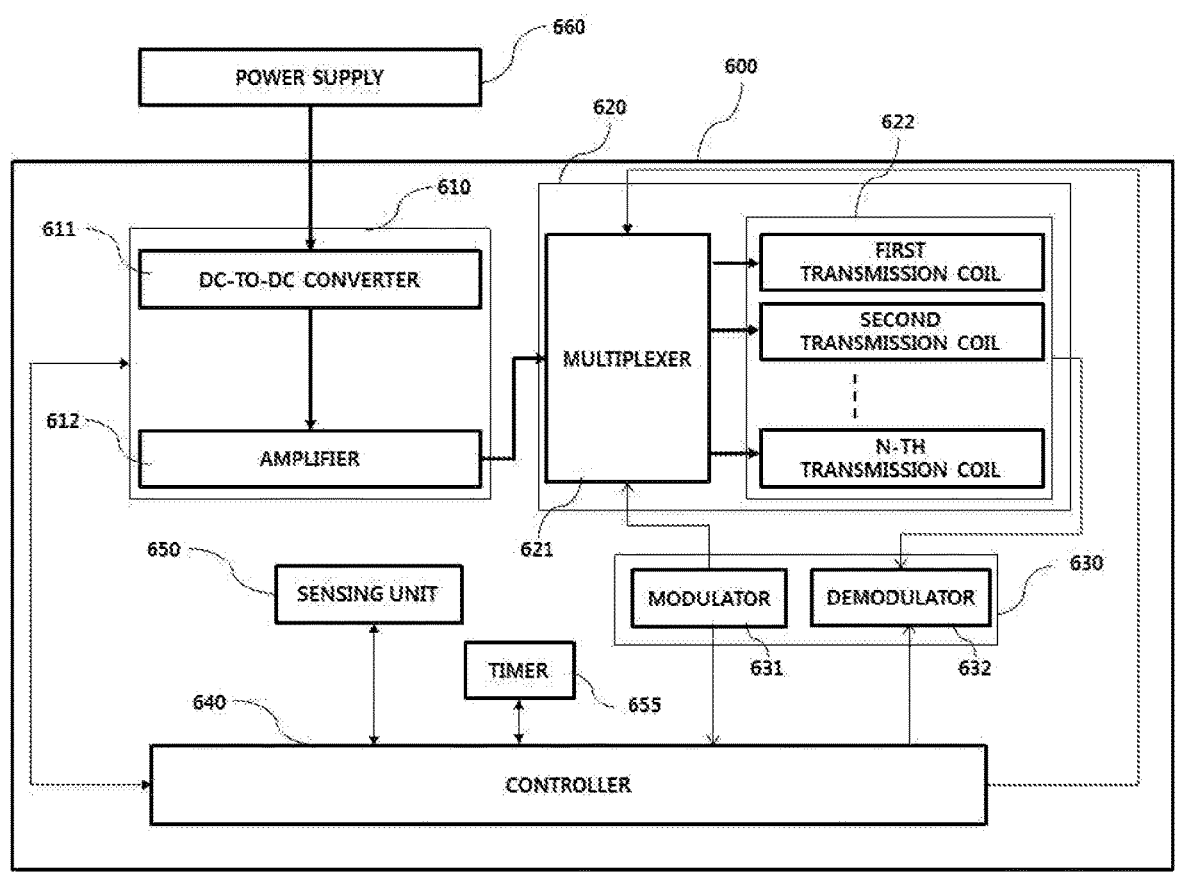
FIG. 6 is a block diagram illustrating the structure of a wireless power transmitter according to an embodiment.

FIG. 6 is a block diagram illustrating the structure of a wireless power transmitter according to an embodiment.

Referring to FIG. 6, the wireless power transmitter 600 may roughly include a power converter 610, a power transmission unit 620, a communication unit 630, a controller 640, and a sensing unit 650. The configuration of the wireless power transmitter 600 is not necessarily essential and thus more or fewer components may be included.

As shown in FIG. 6, the power converter 610 may receive and convert power from a power supply 660 into power having a predetermined strength.

The power converter 610 may include a DC-to-DC converter 611 and an amplifier 612.

The DC-to-DC converter 611 may perform a function for converting DC power received from the power supply 660 into DC power having a specific strength according to a control signal of the controller 640.

At this time, the sensing unit 650 may measure and supply the voltage/current of the converted DC power to the controller 640. In addition, the sensing unit 650 may measure the internal temperature of the wireless power transmitter 600 and supply the measured result to the controller 640, in order to determine whether overheating occurs. For example, the controller 640 may adaptively cut off power supplied from the power supply 660 or prevent power from being supplied to the amplifier 612 based on the voltage/current value measured by the sensing unit 650. A predetermined power cutoff circuit for cutting off power supplied from the power supply 660 or power supplied to the amplifier 612 may be further provided at one side of the power converter 610.

The amplifier 612 may control the strength of the DC-to-DC converted power according to the control signal of the controller 640. For example, the controller 640 may receive power reception status information and/or a power control signal of the wireless power receiver through the communication unit 630 and dynamically control the amplification factor of the amplifier 612 based on the received power reception status information and/or power control signal. For example, the power reception status information may include, but is not limited to, the strength information of a rectifier output voltage, the strength information of current applied to a reception coil, etc. The power control signal may include a signal for requesting power increase, a signal for requesting power decrease, etc.

The power transmission unit 620 may include a multiplexer 621 and transmission coils 622. In addition, the power transmission unit 620 may further include a carrier generator (not shown) for generating a specific operating frequency for power transfer.

The carrier generator may generate a specific frequency for converting output DC power of the amplifier 612 received through the multiplexer 621 into AC power having a specific frequency. Although the AC signal generated by the carrier generator is mixed in the output terminal of the multiplexer 621 to generate AC power in the above description, this is merely exemplary and the AC signal may be mixed in the previous or next stage of the amplifier 612.

In one embodiment, it should be noted that the frequencies of the AC powers sent to the transmission coils may be different from each other. In another embodiment, the resonant frequencies of the transmission coils may be differently set using a predetermined frequency controller having a function for differently adjusting LC resonance characteristics of the transmission coils.

As shown in FIG. 6, the power transmission unit 620 may include the multiplexer 621 for controlling transmission of the output power of the amplifier 612 to the transmission coils, and the plurality of coils 622, that is, first to n-th transmission coils.

The controller 640 according to one embodiment may transmit power through time division multiplexing of the transmission coils if a plurality of wireless power receivers is connected. For example, if the wireless power transmitter 600 identifies three wireless power receivers, that is, first to third receivers, through three different transmission coils, that is, first to third transmission coils, the controller 640 may control the multiplexer 621 to control a specific transmission coil to transmit power in a specific time slot. At this time, although the amount of power transmitted to the wireless power receiver may be controlled according to the length of the time slot allocated to each transmission coil, this is merely exemplary and the amplification factor of the amplifier 612 during the time slot allocated to each transmission coil may be controlled to control the power transmitted to each wireless power receiver.

The controller 640 may control the multiplexer 621 such that a sensing signal is sequentially transmitted through the first to n-th transmission coils 622 during a primary sensing signal transmission procedure. At this time, the controller 640 may identify a time when the sensing signal will be transmitted using a timer 655 and control the multiplexer 621 to transmit the sensing signal through the corresponding transmission coil when the sensing signal transmission time arrives. For example, the timer 655 may transmit a specific event signal to the controller 640 at predetermined periods during the ping transmission phase, and the controller 640 may control the multiplexer 621 to transmit the digital ping through the corresponding transmission coil, when the corresponding event signal is sensed.

In addition, the controller 640 may receive a predetermined transmission coil identifier for identifying through which transmission coil a signal strength indicator has been received from a demodulator 632 during the primary sensing signal transmission procedure and the signal strength indicator received through the corresponding transmission coil. Subsequently, in a secondary sensing signal transmission procedure, the controller 640 may control the multiplexer 621 to transmit the sensing signal only through the transmission coil(s) through which the signal strength indicator is received during the primary sensing signal transmission procedure. In another example, if the signal strength indicator is received through the plurality of transmission coils during the primary sensing signal transmission procedure, the controller 640 may determine a transmission coil, through which a signal strength indicator having a largest value is received, as a transmission coil, through which the sensing signal will be first transmitted in the secondary sensing signal transmission procedure, and control the multiplexer 621 according to the result of determination.

A modulator 631 may modulate the control signal generated by the controller 640 and transmit the modulated signal to the multiplexer 621. Here, the modulation method of modulating the control signal may include, but is not limited to, a frequency shift keying (FSK) modulation method, a Manchester coding modulation method, a phase shift keying (PSK) modulation method, a pulse width modulation method, a differential biphase modulation method, etc.

When the signal received through the transmission coil is sensed, the demodulator 632 may demodulate and transmit the sensing signal to the controller 640. Here, the demodulated signal may include, but is not limited to, a signal strength indicator, an error correction (EC) indicator for power control during wireless power transmission, an end of charge (EOC) indicator, an overvoltage/overcurrent indicator, etc. and may further include a variety of status information for identifying the status of the wireless power receiver.

In addition, the demodulator 632 may identify through which transmission coil the demodulated signal is received, and provide a predetermined transmission coil identifier corresponding to the identified transmission coil to the controller 640.

In addition, the demodulator 632 may demodulate the signal received through the transmission coil 623 and transmit the demodulated signal to the controller 640. For example, the demodulated signal may include, but is not limited to, a signal strength indicator and the demodulated signal may include a variety of status information of the wireless power receiver.

For example, the wireless power transmitter 600 may acquire the signal strength indicator through in-band communication for performing communication with the wireless power receiver using the same frequency as used for wireless power transmission.

In addition, the wireless power transmitter 600 may not only transmit wireless power through the transmission coil 622 but also exchange a variety of information with the wireless power receiver through the transmission coil 622. In another example, the wireless power transmitter 600 may further include separate coils respectively corresponding to the transmission coil 622, that is, the first to n-th transmission coils, and perform in-band communication with the wireless power receiver using the separate coils.

Although the wireless power transmitter 600 and the wireless power receiver perform in-band communication in the description of FIG. 6, this is merely exemplary and short-range bidirectional communication may be performed through a frequency band different from a frequency band used to transmit the wireless power signal. For example, short-range bidirectional low-energy communication may be any one of Bluetooth communication, RFID communication, UWB communication and ZigBee communication.

In particular, the wireless power transmitter 600 according to the embodiment may adaptively provide a fast charging mode and a normal low-power charging mode according to a request of the wireless power receiver.

The wireless power transmitter 600 may transmit a signal having a predetermined pattern, which is referred to as a first packet, for convenience of description, if the fast charging mode is supportable. When the wireless power receiver 600 receives the first packet, it is possible to identify that the wireless power transmitter 600, which is being connected, may perform fast charging.

In particular, the wireless power receiver may transmit a predetermined first response packet for requesting fast charging to the wireless power transmitter 600, if fast charging is necessary.

In particular, the wireless power transmitter 600 may automatically switch to a fast charging mode to start fast charging when a predetermined time has elapsed after receiving the first response packet.

For example, although the controller 640 of the wireless power transmitter 600 may control transmission of the first packet through the transmission coil 622 upon transitioning to the power transfer phase 440 or 560 of FIG. 4 or 5, this is merely exemplary. In another example of the present disclosure, the first packet may be transmitted in the identification and configuration phase 430 of FIG. 4 or the identification phase 530 of FIG. 5.

In another embodiment, information capable of identifying whether fast charging is supportable may be encoded and transmitted in the digital ping signal transmitted by the wireless power transmitter 600.

The wireless power receiver may transmit a predetermined charging mode packet having a charging mode set to fast charging to the wireless power transmitter 600, if fast charging is required at any point of time in the power transfer phase. Here, the detailed configuration of the charging mode packet will become apparent through the description of FIGS. 8 to 12. Of course, if the charging mode is changed to the fast charging mode, the wireless power transmitter 600 and the wireless power receiver may control internal operation such that power corresponding to the fast charging mode may be transmitted and received. For example, if the charging mode is changed from the normal low-power charging mode to the fast charging mode, an overvoltage determination criterion, an over temperature determination criterion, an optimum voltage level, and a power control offset value may be changed and set.

For example, if the charging mode is changed from the normal low-power charging mode to the fast charging mode, a threshold voltage for overvoltage determination may be set high such that fast charging is possible. In another example, a threshold temperature for determining whether overheating occurs may be set high in consideration of temperature rise according to fast charging. In another example, a power control offset value meaning a minimum level of the power at the transmission end may be set to a larger value as compared to the normal low-power charging mode such that fast convergence upon a target power level is possible in the fast charging mode.

Figure 7:
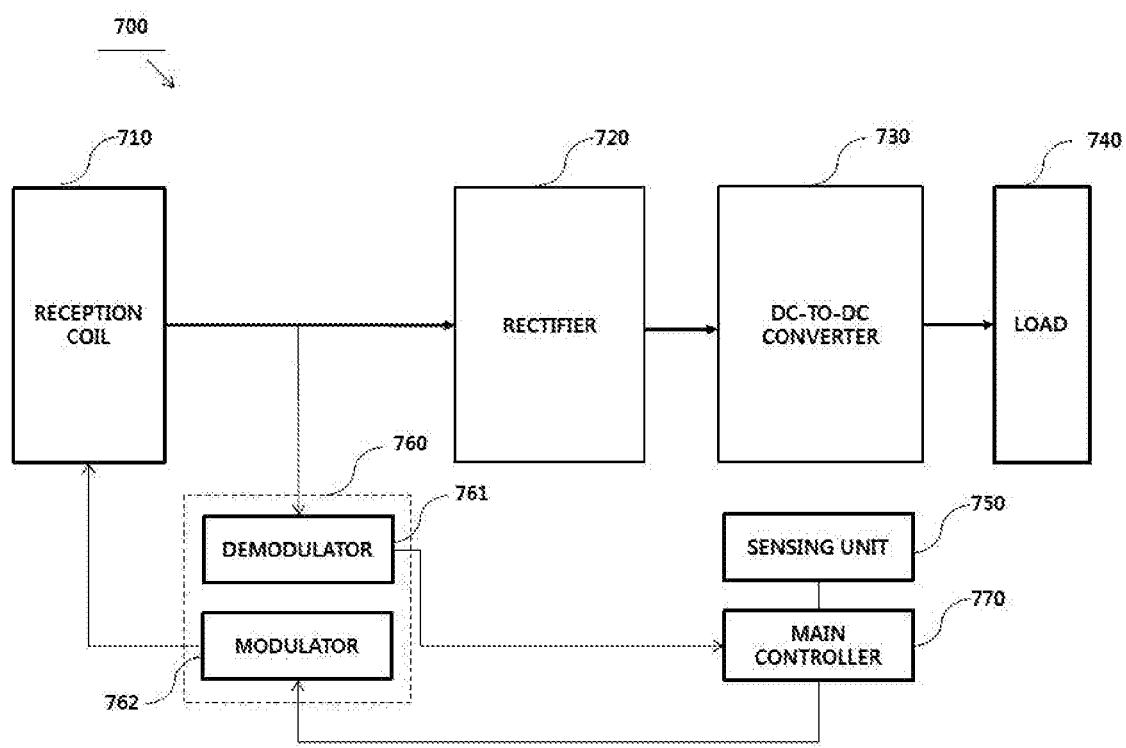
FIG. 7 is a block diagram illustrating the structure of a wireless power receiver interworking with the wireless power transmitter shown in FIG. 6.

FIG. 7 is a block diagram illustrating the structure of a wireless power receiver interworking with the wireless power transmitter shown in FIG. 6.

Referring to FIG. 7, the wireless power receiver 700 may include a reception coil 710, a rectifier 720, a DC-to-DC converter 730, a load 740, a sensing unit 750, a communication unit 760, and a main controller 770. The communication unit 760 may include a demodulator 761 and a modulator 762.

Although the wireless power receiver 700 shown in the example of FIG. 7 is shown as exchanging information with the wireless power transmitter 600 through in-band communication, this is merely exemplary and the communication unit 760 according to another embodiment may provide short-range bidirectional communication through a frequency band different from a frequency band used to transmit a wireless power signal.

AC power received through the reception coil 710 may be transmitted to the rectifier 720. The rectifier 720 may convert the AC power into DC power and transmit the DC power to the DC-to-DC converter 730. The DC-to-DC converter 730 may convert the strength of the DC power output from the rectifier into a specific strength required by the load 740 and transmit the converted power to the load 740.

The sensing unit 750 may measure the strength of the DC power output from the rectifier 720 and provide the strength to the main controller 770. In addition, the sensing unit 750 may measure the strength of current applied to the reception coil 710 according to wireless power reception and transmit the measured result to the main controller 770. In addition, the sensing unit 750 may measure the internal temperature of the wireless power receiver 700 and provide the measured temperature value to the main controller 770.

For example, the main controller 770 may compare the strength of the DC power output from the rectifier with a predetermined reference value and determine whether overvoltage occurs. Upon determining that overvoltage occurs, a predetermined packet indicating that overvoltage has occurred may be generated and transmitted to the modulator 762. The signal modulated by the modulator 762 may be transmitted to the wireless power transmitter 600 through the reception coil 710 or a separate coil (not shown). If the strength of the DC power output from the rectifier is equal to or greater than the predetermined reference value, the main controller 770 may determine that a sensing signal is received and perform control to transmit a signal strength indicator corresponding to the sensing signal to the wireless power transmitter 600 through the modulator 762 upon receiving the sensing signal. In another example, the demodulator 761 may demodulate the AC power signal between the reception coil 710 and the rectifier 720 or the DC power signal output from the rectifier 720, identify whether a sensing signal is received, and provide the identified result to the main controller 770. At this time, the main controller 770 may perform control to transmit the signal strength indicator corresponding to the sensing signal through the modulator 762.

In particular, the main controller 770 according to the embodiment may determine whether the connected wireless power transmitter performs fast charging based on the information demodulated by the demodulator 761.

In addition, when a predetermined fast charging request signal for requesting fast charging is received from the electronic apparatus 30 of FIG. 1, the main controller 770 may generate and transmit a charging mode packet corresponding to the received fast charging request signal to the modulator 762. The fast charging request signal from the electronic apparatus may be received according to user menu selection on a predetermined user interface.

The main controller 770 according to another embodiment may perform control to automatically request fast charging from the wireless power transmitter or enable the wireless power transmitter to stop fast charging and to switch to the normal low-power charging mode based on a battery remaining amount, upon determining that the connected wireless power transmitter supports the fast charging mode.

The main controller 770 according to another embodiment may monitor power consumption of the electronic apparatus in real time while charging is performed in the normal low-power charging mode. If the power consumption of the electronic apparatus is equal to or greater than a predetermined reference value, the main controller 770 may generate and transmit a predetermined charging mode packet for requesting switching to the fast charging mode to the modulator 762.

The main controller 770 according to another embodiment may compare an internal temperature value measured by the sensing unit 750 with a predetermined reference value and determine whether overheating occurs. If overheating occurs during fast charging, the main controller 770 may generate and transmit a charging mode packet such that the wireless power transmitter is switched to the normal low-power charging mode.

The main controller 770 according to another embodiment may determine whether the charging mode needs to be changed based on at least one of a battery charging rate, the strength of the voltage output from the rectifier, a usage rate of a CPU mounted in the electronic apparatus and user menu selection and generate and transmit a charging mode packet including the value of the charging mode to be changed to the wireless power transmitter if the charging mode needs to be changed.

Figure 8:
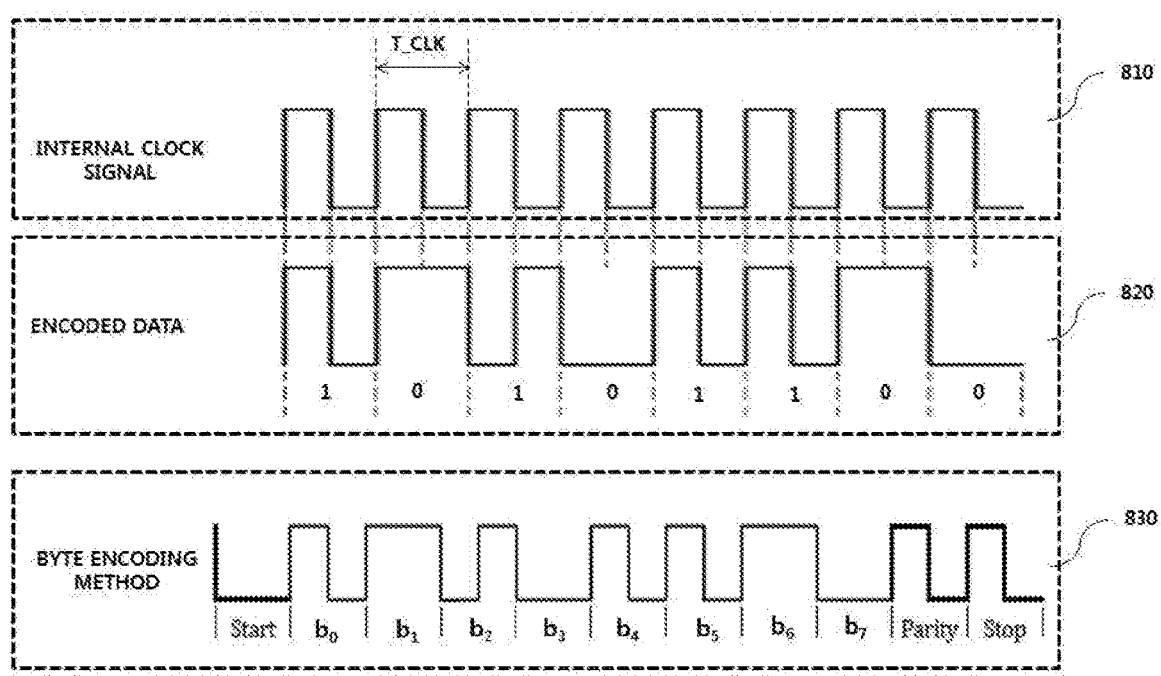
FIG. 8 is a view illustrating a method of modulating and demodulating a wireless power signal according to an embodiment.

FIG. 8 is a view illustrating a method of modulating and demodulating a wireless power signal according to an embodiment.

As denoted by reference numeral 810 of FIG. 8, the wireless power transfer end 10 and the wireless power reception end 20 may encode or decode a packet to be transmitted based on an internal clock signal having the same period.

Hereinafter, the method of encoding the packet to be transmitted will be described in detail with reference to FIGS. 1 to 8.

Referring to FIG. 1, if the wireless power transfer end 10 or the wireless power reception end 20 does not transmit a specific packet, the wireless power signal may be an unmodulated AC signal having a specific frequency as denoted by reference numeral 41 of FIG. 1. In contrast, if the wireless power transfer end 10 or the wireless power reception end 20 transmits a specific packet, the wireless power signal may be an AC signal modulated using a specific modulation method as denoted by reference numeral 42 of FIG. 1. For example, the modulation method may include, but is not limited to, an amplitude modulation method, a frequency modulation method, a frequency and amplitude modulation method, a phase modulation method, etc.

Differential biphase encoding is applicable to binary data of the packet generated by the wireless power transfer end 10 or the wireless power reception end 20 as denoted by reference numeral 820. Specifically, differential biphase encoding has two state transitions to encode data bit 1 and one state transition to encode data bit 0. That is, data bit 1 is encoded such that transition between a HI state and a LO state occurs in a rising edge and a falling edge of the clock signal and data bit 0 is encoded such that transition between a HI state and a LO state occurs in a rising edge of the clock signal.

A byte encoding method denoted by reference numeral 830 is applicable to the encoded binary data. Referring to reference numeral 830, the byte encoding method according to the embodiment may be a method of inserting a start bit and a stop bit for identifying start and stop of the bit stream with respect to the 8-bit encoded binary bit stream and a parity bit for sensing whether an error of the bit stream (byte) occurs.

Figure 9:
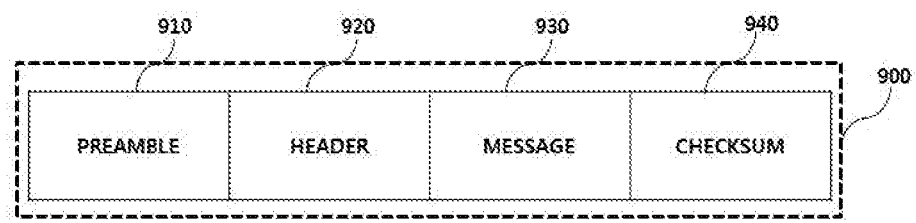
FIG. 9 is a view illustrating a packet format according to an embodiment.

FIG. 9 is a view illustrating a packet format according to an embodiment.

Referring to FIG. 9, the packet format 900 used for information exchange between the wireless power transfer end and the wireless power reception end 20 may include a preamble 910 field for acquiring synchronization for demodulation of the corresponding packet and identifying an accurate start bit of the corresponding packet, a header 920 field for identifying the type of a message included in the corresponding packet, a message 930 field for transmitting the content (or payload) of the corresponding packet, and a checksum 940 field for identifying whether an error has occurred in the corresponding packet.

As shown in FIG. 9, a packet reception end may identify the size of the message 930 included in the corresponding packet based on the value of the header 920.

In addition, the header 920 may be defined for each step of the wireless power transfer procedure, and the value of the header 920 may be defined as the same value in different phases. For example, referring to FIG. 9, it should be noted that the header value corresponding to end power transfer of the ping phase and end power transfer of the power transfer phase is 0x02.

The message 930 includes data to be transmitted by the transmission end of the corresponding packet. For example, the data included in the message 930 field may be a report, a request, or a response, without being limited thereto.

The packet 900 according to another embodiment may further include at least one of transmission end identification information for identifying the transmission end for transmitting the corresponding packet and reception end identification information for identifying the reception end for receiving the corresponding packet. The transmission end identification information and the reception end identification may include IP address information, MAC address information, product identification information, etc. However, the present disclosure is not limited thereto and information for distinguishing the reception end and the transmission end in the wireless charging system may be included.

The packet 900 according to another embodiment may further include predetermined group identification information for identifying a reception group if the corresponding packet is received by a plurality of apparatuses.

FIG. 10 is a view illustrating the types of packets transmitted from the wireless power receiver to the wireless power transmitter according to an embodiment.

Referring to FIG. 10, the packet transmitted from the wireless power receiver to the wireless power transmitter may include a signal strength packet for transmitting the strength information of a sensed ping signal, a power transfer type (end power transfer) for requesting power transfer end from the transmitter, a power control hold-off packet for transferring time information waiting until actual power is controlled after a control error packet for control is received, a configuration packet for transferring configuration information of the receiver, an identification packet and an extended identification packet for transmitting receiver identification information, a general request packet for transmitting a general request message, a specific request packet for transmitting a specific request message, an FOD status packet for transmitting a reference quality factor value for FO detection, a control error packet for controlling power transmitted by the transmitter, a renegotiation packet for starting renegotiation, a 24-bit received power packet for transmitting the strength information of the received power, and a charge status packet for transmitting the current charging status information of the load.

The packets transmitted from the wireless power receiver to the wireless power transmitter may be transmitted using in-band communication using the same frequency band as the frequency band used to transmit wireless power.

Figure 11:
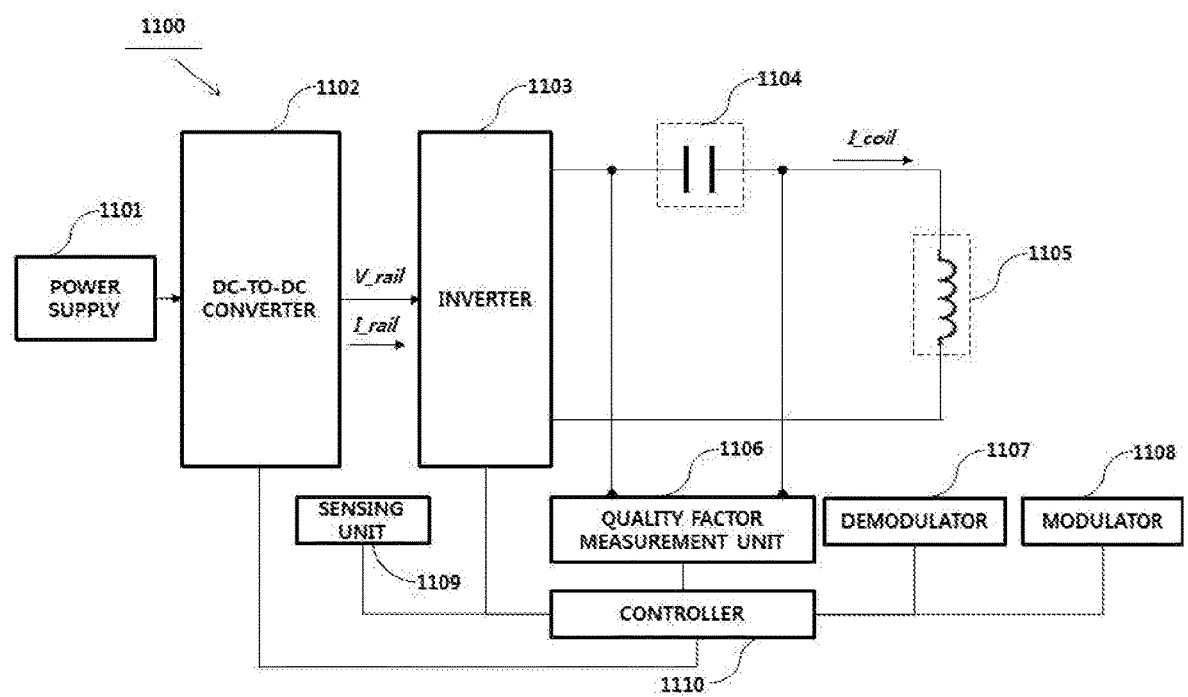
FIG. 11 is a block diagram illustrating the structure of a foreign object detection apparatus according to an embodiment.

FIG. 11 is a block diagram illustrating the structure of a foreign object detection apparatus according to an embodiment.

Referring to FIG. 11, a foreign object detection apparatus 100 may include a power supply 1101, a DC-to-DC converter 1102, an inverter 1103, a resonant capacitor 1104, a transmission coil 1105, a transmission coil 1105, a quality factor measurement unit 1106, a demodulator 1107, a modulator 1108, a sensing unit 1109 and a controller 1110.

The power supply 1101 may receive DC power through an external power terminal and transmit the DC power to the DC-to-DC converter 1102.

The DC-to-DC converter 1102 may convert the strength of the DC power received from the power supply 1101 into a specific strength of DC power under control of the controller 110. For example, the DC-to-DC converter 1102 may include a variable voltage generator capable of adjusting the strength of the voltage, without being limited thereto.

The inverter 1103 may convert the converted DC power into AC power. The inverter 1103 may convert the DC power signal input through control of a plurality of switches into an AC power signal and output the AC power signal.

For example, the inverter 1103 may include a full bridge circuit. However, the present disclosure is not limited thereto and the inverter may include a half bridge circuit.

In another example, the inverter 1103 may include a half bridge circuit and a full bridge circuit. In this case, the controller 110 may dynamically determine whether the inverter 1103 operates as a half bridge or a full bridge.

The wireless power transmission apparatus according to one embodiment may adaptively control the bridge mode of the inverter 1103 according to the strength of the power required by the wireless power reception apparatus. For example, if the wireless power reception apparatus requests low power of 5 W, the controller 1110 may perform control to drive the half bridge circuit.

In contrast, if the wireless power reception apparatus requests high power of 15 W, the controller 1110 may perform control to drive the full bridge circuit.

In another example, the wireless power transmission apparatus may adaptively select and drive the full bridge circuit or the half bridge circuit according to a sensed temperature. For example, if the temperature of the wireless power transmission apparatus exceeds a predetermined reference value while wireless power is transmitted using the half bridge circuit, the controller 1110 may deactivate the half bridge circuit and activate the full bridge circuit. That is, the wireless power transmission apparatus may increase the voltage and decrease the strength of current flowing in the transmission coil 1105 through the full bridge circuit for transmission of power having the same strength, thereby decreasing the temperature of the wireless power transmission apparatus to a reference value or less. In general, the amount of heat generated in an electronic part mounted in the electronic apparatus may be more sensitive to the strength of current than the strength of the voltage applied to the electronic part.

In addition, the inverter 1103 may not only convert the DC power into AC power but also change the strength of the AC power.

For example, the inverter 1103 may adjust the strength of the output AC power by adjusting the frequency of a reference alternating current signal used to generate the AC power under control of the controller 1110. To this end, the inverter 1103 may include a frequency oscillator for generating the reference alternating current signal having a specific frequency. However, this is merely exemplary and the frequency oscillator may be mounted independently of the inverter 1103.

The quality factor measurement unit 1106 may monitor change in inductance (or voltage or current) across the resonant capacitor 1104 and measure the quality factor value of the transmission coil of the wireless power transmission apparatus. At this time, the measured quality factor value may be sent to the controller 1110, and the controller 1110 may store the current quality factor value received from the quality factor measurement unit 1106 in a predetermined recording region.

For example, the controller 1110 may measure the quality factor value in the selection phases 410 and 510 of FIGS. 4 and 5.

The controller 1110 may determine a foreign object detection (FOD) quality factor threshold value FOD_QFT_Value for determining whether a foreign object is present based on a reference quality factor value RQF_Value received from the wireless power receiver.

The controller 1110 may perform a foreign object detection procedure based on the quality factor value for comparing a Measured_Quality_Factor_Value MQF_Value with FOD_QFT_Value to determine whether a foreign object is present.

Here, RQF_Value may be determined to be the smallest value of the quality factor values measured at a plurality of points in the charging area of a specific wireless power transmitter specified for performance test.

FOD_QFT_Value may be determined to be a value obtained by subtracting reference quality factor accuracy and production and measurement tolerance from the RQF_Value.

Here, the reference quality factor accuracy may be an allowable range of the tolerance of the reference quality factor value measured when a foreign object is not present. For example, the reference quality factor value, to which the allowable range of the tolerance is applied, may be set to a ratio increased or decreased from the reference quality factor value received from the wireless power reception apparatus, without being limited thereto.

In the current WPC Qi standard, the same reference quality factor accuracy is defined to be applied to all products.

However, the reference quality factor accuracy may vary according to the manufacturer of the product and the type of the product. For example, the wireless power receiver of company A and the wireless power receiver of company B may interwork with the same wireless power transmitter, thereby measuring the reference quality factor value. However, the accuracies of the measured reference quality factor values of two products may be different from each other. Accordingly, the FOD_QFT_Value for determining whether a foreign object is present based on different reference quality factor accuracies of the wireless power receivers may not be an accurate threshold value for determining whether the foreign object is present.

For example, as the result of testing the same wireless power transmitter, the measured reference quality factor value of the wireless power receiver of company A may be 100 and the measured reference quality factor value of the wireless power receiver of company B may be 70. In this case, when the reference quality factor accuracy corresponding to the wireless power receiver company B is set to +/−7% and the reference quality factor accuracy corresponding to the wireless power receiver company A is set to +/−10%, a possibility of accurately detecting a foreign object may be increased as compared to the case where the reference quality factor accuracies corresponding to the wireless power receiver companies A and B are set to +/−10%. However, since the same reference quality factor accuracy is applied to all wireless power receives at the time of FOD authentication test according to the current WPC Qi standard, the FOD authentication test cannot be accurately performed.

The demodulator 1107 demodulates an in-band signal received from the wireless power receiver and transmits the demodulated signal to the controller 1110. For example, the demodulator 1107 may demodulate the FOD status packet of FIG. 12 (or the FOD status packet of FIG. 16) and the configuration packet of FIG. 17 and transmit the demodulated packet to the controller 1110. Here, the FOD status packet may be received from the wireless power reception apparatus in the negotiation phase 540 of FIG. 5.

Figure 17:
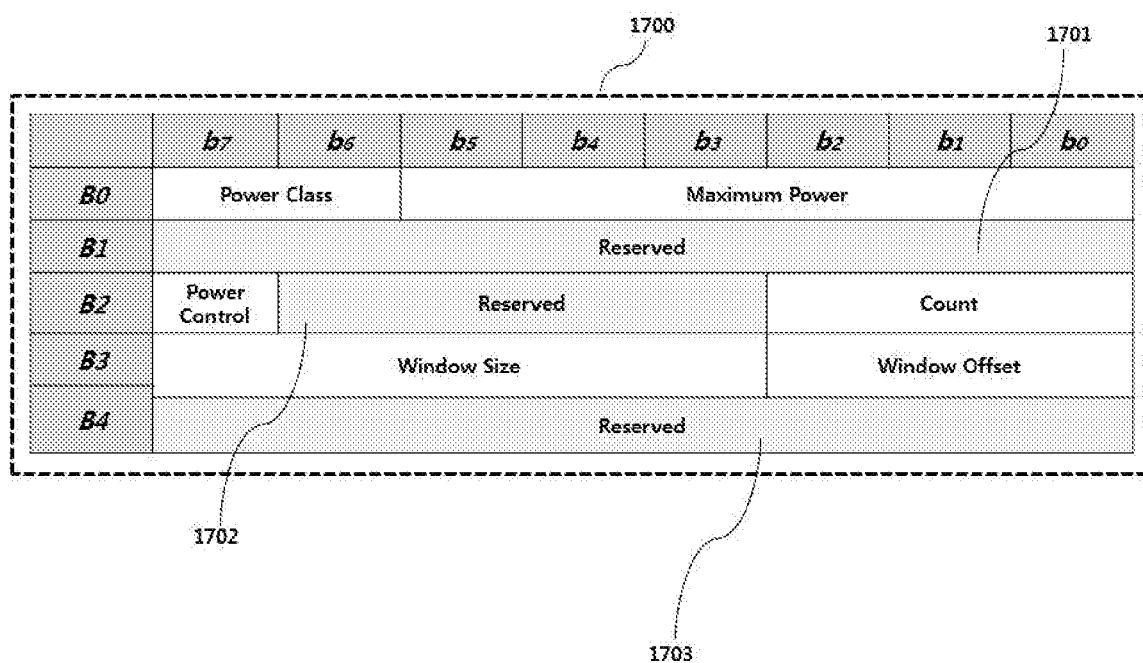
FIG. 17 is a view illustrating the structure of a configuration packet message according to an embodiment.

In one embodiment, a predetermined receiver type identifier for identifying the kind and type of the wireless power receiver may be included in the FOD status packet or the configuration packet of FIG. 17.

The controller 1110 may determine a predetermined current change threshold Delta_Current_Threshold for determining whether a foreign object is present based on the received receiver type identifier. The controller 1110 may compare I_rail change Delta_RAIL_Current measured in the ping phase with a determined current change threshold value and determine whether a foreign object is present.

In one embodiment, if the receiver type identifier is included and received in the configuration packet, the controller 1110 may determine whether a foreign object is present in the identification and configuration phase 530 of FIG. 5.

In another example, if the receiver type identifier is included and received in the FOD status packet, the controller 1110 may determine whether a foreign object is present in the negotiation phase 540 of FIG. 5.

Upon determining that the foreign object is present in the identification and configuration phase 530, the controller 1110 may transition the status of the wireless power transmitter to the selection phase 510.

Upon determining that the foreign object is present in the negotiation phase 540, the controller 1110 may not enter the power transfer phase 560 and enter the selection phase 510.

The modulator 1108 according to one embodiment modulates the control packet received from the controller 1110 and transmits the modulated packet through the transmission coil 1105. For example, when the FOD status packet including the receiver type identifier is received, the controller 1110 may determine a current change threshold value corresponding to the receiver type identifier, compare the current change of the inverter 1103 in the ping phase, that is, Delta_Rail_Current, with the determined current change threshold value, and finally determine whether a foreign object is present. According to the result of determining whether a foreign object is present, the controller 1110 may generate and transmit an ACK packet or a NACK packet to the modulator 1108. Here, the ACK packet may mean that the foreign object is not detected and the NACK packet may mean that the foreign object is detected.

In another example, the controller 1110 may check whether the foreign object detection procedure based on the quality factor value is possible when the FOD status packet is received and transmit the ACK packet or the NACK packet to the wireless power reception apparatus through the modulator 1108 according to the checked result. The ACK packet may mean that the wireless power transmission apparatus performs the foreign object detection procedure based on the quality factor value. In contrast, the NACK packet may mean that the foreign object detection procedure based on the quality factor value is not performed. The wireless power transmission apparatus may identify whether the foreign object is detected based on the quality factor value, according to the versions of installed software and hardware.

The controller 1110 according to another embodiment may perform a foreign object detection procedure based on the quality factor value after comparing Delta_Rail_Current with Delta_Current_Threshold to determine whether the foreign object is present. Hereinafter, for convenience of description, the procedure for comparing Delta_Rail_Current with Delta_Current_Threshold to determine whether the foreign object is present may be referred to as a foreign object detection procedure based on current change.

For example, upon determining that the foreign object is present through the foreign object detection procedure based on current change and the foreign object detection procedure based on the quality factor value, the controller 1110 may finally determine that the foreign object is present.

In another example, upon determining that the foreign object is present in at least one of the foreign object detection procedure based on current change and the foreign object detection procedure based on the quality factor value, the controller 1110 may finally determine that the foreign object is present.

In another example, upon determining that the foreign object is present through the foreign object detection procedure based on the quality factor value, the controller 1110 may perform the foreign object detection procedure based on current change. In this case, only upon determining that the foreign object is present in the foreign object detection procedure based on current change, the controller 100 may determine that the foreign object is present.

In another example, if the foreign object detection procedure based on the quality factor value is impossible upon receiving the FOD status packet, the controller 1110 may perform the foreign object detection procedure based on current change to determine whether the foreign object is present. At this time, upon determining that the foreign object is present, the controller 1110 may not transition from the negotiation phase 540 of FIG. 5 to the power transfer phase 560 and may control a specific notification means to notify the user that the foreign object is present in the charging area. For example, the notification means may include, but is not limited to, a beeper, an LED lamp, a vibration element, a liquid crystal display, etc.

For example, the sensing unit 1109 may measure the strength of current/voltage/power between the DC-to-DC converter 1102 and the inverter 1103 and/or the strength change of the current/voltage/power and transmit the measured result to the controller 1110.

Hereinafter, for convenience of description, current flowing between the DC-to-DC converter 1102 and the inverter 1103 is referred to as I_rail, the voltage applied to the output terminal of the DC-to-DC converter 1102 or the input terminal of the inverter 1103 is referred to as V_rail, and power transmitted from the DC-to-DC converter 1102 to the inverter 1103 is referred to as P_rail.

In another example, the sensing unit 1109 may measure the strength of the current flowing in the transmission coil 1105, that is, the inductor, and the strength of the voltage applied across the transmission coil 1105 and transmit the measured result to the controller 1110.

The controller 1110 according to an embodiment may compare the strength I_rail of the current applied to the inverter 1103 in the ping phase with a predetermined current threshold value to determine whether the foreign object is present. Upon determining that a possibility that the foreign object is present is high, the controller 1110 may decrease the reference quality factor accuracy to a certain level. For example, upon determining that a possibility that the foreign object is present is high, the controller 1110 may adjust the reference quality factor accuracy from +/−10% to +/−5% to determine the FOD_QFT_Value. Accordingly, the controller 1110 may improve foreign object detection accuracy upon determining whether the foreign object is present based on the quality factor value. In contrast, upon determining that a possibility that the foreign object is present is low, the controller 1110 may determine the FOD_QFT_Value based on predefined reference quality factor accuracy.

The controller 1110 may determine that the foreign object is present, if the MQF_Value is less than FOD_QFT_Value. If the foreign object is present, the controller 1110 may not transition from the negotiation phase 540 of FIG. 5 to the power transfer phase 560. At this time, the controller 1110 may control a specific notification means to notify the user that the foreign object is present in the charging area. For example, the notification means may include, but is not limited to, a beeper, an LED lamp, a vibration element, a liquid crystal display, etc.

The controller 1110 may determine that the foreign object is not present, if the MQF_Value is equal to or greater than FOD_QFT_Value. If the foreign object is not present, the controller 111 may enter the power transfer phase and perform control to transmit power requested by the wireless power transmission apparatus.

In addition, the controller 1110 according to another embodiment may compare the current value measured in the ping phase, for example, the output current I_rail of the DC-to-DC converter or the current I_coil applied to the transmission coil 1105, with a predetermined reference current value. If the measured current value is greater than the reference current value, it may be determined that a possibility that the foreign object is present is low. In this case, the controller 1110 may not perform the foreign object detection procedure based on the quality factor value even when the FOD status packet is received in the negotiation phase and may enter the power transfer phase.

Referring to FIG. 11, the inverter input current I_rail is DC current and current flowing in the transmission coil 1105 is AC current. In particular, current input to the inverter 1103 in the ping phase is DC power having a constant level, but the power output from the inverter 1103 may be AC power discontinuously transmitted at a constant period. Accordingly, the time average value of I_rail may be relatively greater than that of I_coil. Accordingly, determining whether the foreign object is present based on the I_rail measured in the ping phase can significantly reduce a probability of incorrect determination. However, the present disclosure is not limited thereto and whether the foreign object is present may be determined based on the I_coil measured in the ping phase.

If a conductive foreign object other than the normal wireless power reception apparatus is located in the charging area of the wireless power transmission apparatus, a mutual impedance value between the transmission coil and the foreign object substantially becomes close to 0. At this time, the strength of current I_rail applied to the inverter 1103 rapidly increases. Accordingly, the controller 1110 may monitor the strength of current I_rail applied to the inverter 1103 in the ping phase, thereby determining whether the foreign object is present.

As described above, the wireless power transmission apparatus according to the embodiment may determine a possibility that the foreign object is present based on current change in the ping phase and adaptively perform the foreign object detection procedure based on the quality factor value according to the determined result, thereby minimizing an unnecessary procedure. In addition, the wireless power transmission apparatus according to the embodiment may decrease the reference quality factor accuracy to be lower than a default set value upon determining that a possibility that the foreign object is present is high, thereby increasing foreign object detection accuracy.

In the foreign object detection method defined in the current WPC Qi standard, the current quality factor value is measured before the wireless power transmitter performs the ping phase, that is, in the selection phase. The wireless power transmitter determines the quality factor threshold value for determining whether the foreign object is present in consideration of the reference quality factor value received from the wireless power receiver in the negotiation phase, the production and measurement tolerance for considering a design difference between transmitters, and the reference quality factor accuracy.

For example, the production and measurement tolerance may be a constant determined based on at least one of the power class of the wireless power transmitter and the characteristics and arrangement structure of the transmission coils installed in the wireless power transmitter.

The reference quality factor value means the smallest value of the quality factor values measured in five areas (center and four positions to the left, right, up and down from the center by 5 mm) of the charging areas of the test power transmitter, for example, an MP1 type transmitter defined in the WPC Qi standard. The quality factor value actually measured in the charging area may differ between the transmitters according to the design difference between MP1 which is the test power transmitter (TPT) and the commercial wireless power transmitter including the inductance value of the transmission coil. Tolerance for calibrating this is referred to as production and measurement tolerance.

The reference quality factor value may be determined to be the smallest value of the quality factor values measured at a plurality of points in the charging area of a specific wireless power transmitter specified for performance test and may be maintained in the wireless power receiver.

For example, the reference quality factor value RQF_FO may be determined to be the smallest value of a first quality factor value measured at the center where the transmission coil (primary coil) and the reception coil (secondary coil) are properly aligned in a state in which the FO is not present near the wireless power receiver placed in the charging area and second quality factor values measured while moving with a constant distance offset, for example, +/−5 mm on the x-axis and the y-axis, without being limited thereto, from the center without rotation of the wireless power receiver in a state in which the FO is not present near the wireless power receiver. The second quality factor values may be measured at at least four different positions.

The foreign object detection apparatus according to one embodiment determines the threshold value for detecting the foreign object in consideration of at least one of the reference quality factor value received through the FOD status packet, the reference quality factor accuracy decided according to the result of determining a possibility that the foreign object is present in the ping phase, and the production and measurement tolerance for considering a design difference between transmitters.

The controller 1110 according to another embodiment may calculate change in strength I_rail of current applied to the inverter 1103 based on the sensing information received from the sensing unit 1109 in the ping phase and store the calculated change in strength of current in a predetermined recording region.

The controller 1110 may compare the change in strength of current pre-stored in the identification and configuration phase with a predetermined current change threshold and determine a possibility that the foreign object is present, that is, a probability.

Upon determining that the possibility that the foreign object is present is high, the controller 1110 may decrease the reference quality factor accuracy to a certain level. For example, upon determining that the possibility that the foreign object is present is high, the controller 1110 may adjust the reference quality factor accuracy from +/−10% to +/−5% to determine the FOD_QFT_Value. Therefore, the controller 1110 can improve foreign object detection accuracy upon determining whether the foreign object is present based on the quality factor value. Upon determining that the possibility that the foreign object is present is low, the controller 1110 may determine the FOD_QFT_Value based on predefined reference quality factor accuracy.

If the MQF_Value is less than the FOD_QFT_Value, the controller 1110 may determine that the foreign object is present. If the foreign object is present, the controller 1110 may not transition from the negotiation phase 540 of FIG. 5 to the power transfer phase 560. At this time, the controller 1110 may control a specific notification means to notify the user that the foreign object is present in the charging area. For example, the notification means may include, but is not limited to, a beeper, an LED lamp, a vibration element, a liquid crystal display, etc.

The controller 1110 may determine that the foreign object is not present, if the MQF_Value is equal to or greater than FOD_QFT_Value. If the foreign object is not present, the controller 111 may enter the power transfer phase and perform control to transmit power requested by the wireless power transmission apparatus.

In addition, the controller 1110 according to another embodiment may compare the current value measured in the ping phase, for example, the output current I_rail of the DC-to-DC converter or the current I_coil applied to the transmission coil 1105, with a predetermined reference current value. If the measured current value is greater than the reference current value, it may be determined that a possibility that the foreign object is present is low. In this case, the controller 1110 may not perform the foreign object determination procedure based on the quality factor value even when the FOD status packet is received in the negotiation phase and may enter the power transfer phase.

Referring to FIG. 11, the inverter input current I_rail is DC current and current flowing in the transmission coil 1105 is AC current. In particular, current input to the inverter 1103 in the ping phase is DC power having a constant level, but the power output from the inverter 1103 may be AC power discontinuously transmitted at a constant period. Accordingly, the time average value of I_rail may be relatively greater than that of I_coil. Accordingly, determining whether the foreign object is present based on the I_rail measured in the ping phase can significantly reduce a probability of incorrect determination.

If a conductive foreign object other than the normal wireless power reception apparatus is located in the charging area of the wireless power transmission apparatus, a mutual impedance value between the transmission coil and the foreign object substantially becomes close to 0. At this time, the strength of current I_rail applied to the inverter 1103 rapidly increases. Accordingly, the controller 1110 may monitor the strength of current I_rail applied to the inverter 1103 in the ping phase, thereby determining a possibility that the foreign object is present.

As described above, the wireless power transmission apparatus according to the embodiment may determine whether the foreign object is present based on change in current applied to the inductor in the ping phase and adaptively interrupt power transfer according to the determined result, thereby minimizing apparatus damage and power waste. In addition, the wireless power transmission apparatus according to the embodiment may dynamically determine the current change threshold value based on the type identifier corresponding to the wireless power receiver upon performing the foreign object detection procedure based on current strength change, thereby increasing foreign object detection accuracy.

Figure 12:
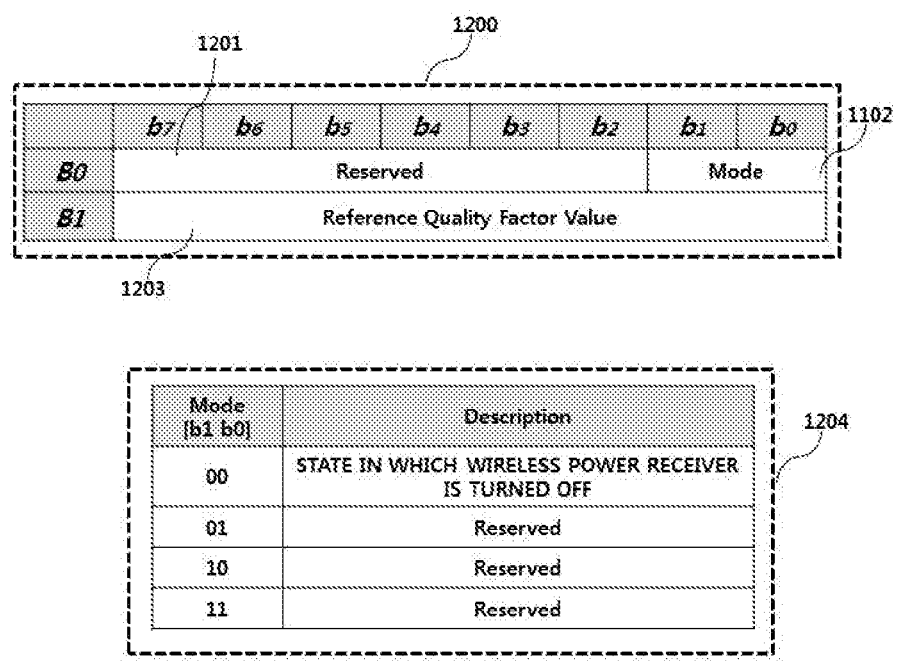
FIG. 12 is a view illustrating the structure of an FOD status packet message.

FIG. 12 is a view illustrating the structure of an FOD status packet message.

Referring to FIG. 12, the FOD status packet message may have a length of 2 bytes and include a reserved field 1201 having a length of 6 bits, a mode field 1202 having a length of 2 bits and a reference quality factor value field 1203 having a length of 1 byte.

All bits configuring the reserved field 1201 may be set to 0.

As denoted by reference numeral 1204, if the mode field 1202 is set to a binary number "00", this may mean that a reference quality factor value measured and determined in a state in which the wireless power receiver is powered off is recorded in the reference quality factor value field 1203.

Figure 13:
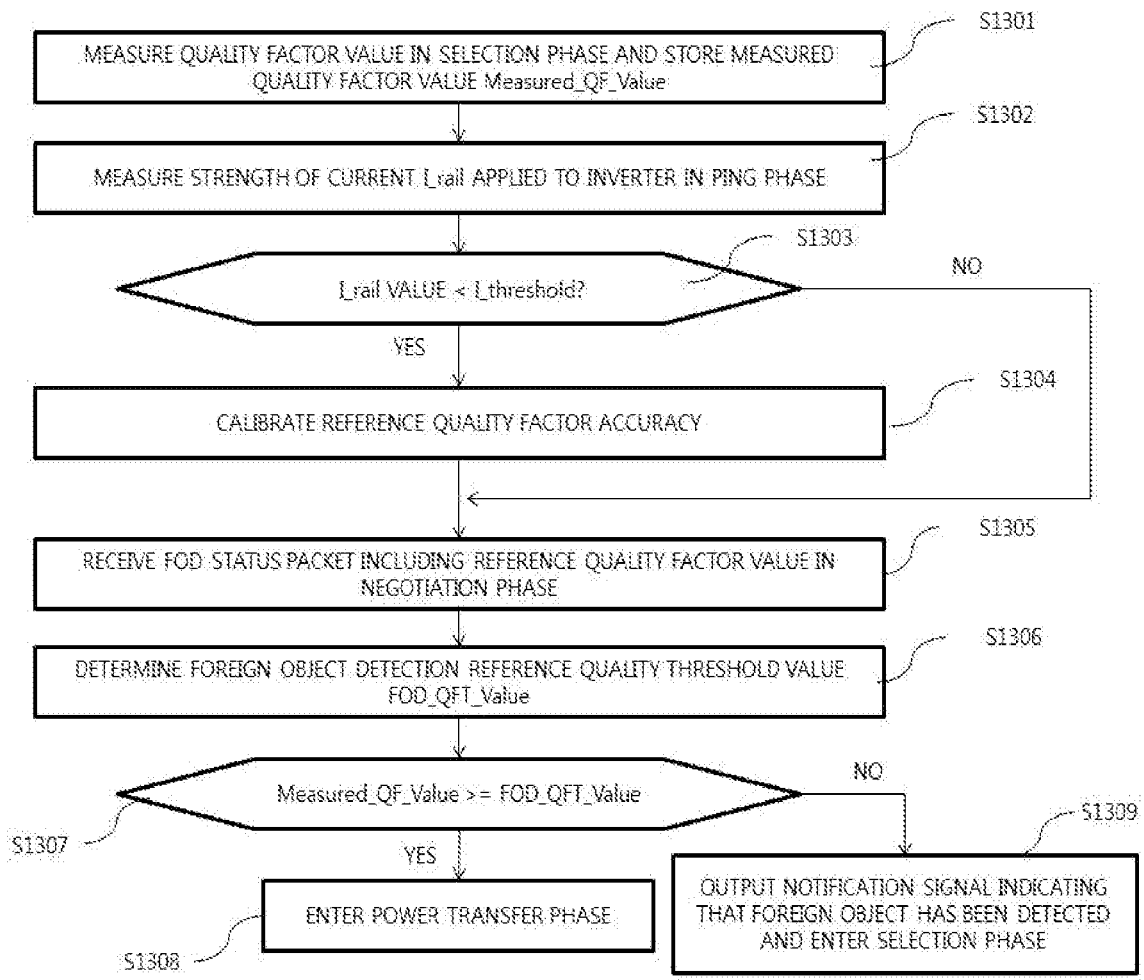
FIG. 13 is a flowchart illustrating a foreign object detection method in a wireless power transmission apparatus according to an embodiment.

FIG. 13 is a flowchart illustrating a foreign object detection method in a wireless power transmission apparatus according to an embodiment.

Referring to FIG. 13, the wireless power transmission apparatus may measure the quality factor value of the transmission coil in the selection phase and store the measured quality factor value Measured_QF_Value in a predetermined recording region (S1301).

When the object is detected in the selection phase, the wireless power transmission apparatus may enter the ping phase to transmit a digital ping signal.

The wireless power transmission apparatus may measure the strength of the current I_rail applied to the inverter in the ping phase (S1302).

The wireless power transmission apparatus may compare the measured strength of I_rail with a predetermined reference current value I_threshold and determine a possibility that the foreign object is present (S1303).

If the measured strength of I_rail is less than the predetermined reference current value I_threshold as the result of comparison, the wireless power transmission apparatus may determine that a possibility that the foreign object is present is high. If the measured strength of I_rail is equal to or greater than the predetermined reference current value I_threshold as the result of comparison, the wireless power transmission apparatus may determine that a possibility that the foreign object is present is low.

Upon determining that the possibility that the foreign object is present is high in step 1303, the wireless power transmission apparatus may calibrate the default reference quality factor accuracy (S1304). The wireless power transmission apparatus according to one embodiment may decrease the default reference quality factor accuracy to a certain level. For example, if the default reference quality factor accuracy is +/−10%, the calibrated reference quality factor accuracy may be +/−5%. However, the present disclosure is not limited thereto and the calibration level may vary according to the design of those skilled in the art.

In contrast, upon determining that that possibility that the foreign object is present is low in step 1303, the default reference quality factor accuracy may be maintained.

Upon entering the negotiation phase, the wireless power transmission apparatus may receive the FOD status packet including the reference quality factor value from the wireless power reception apparatus (S1305).

The wireless power transmission apparatus may determine the foreign object detection reference quality threshold value FOD_QFT_Value based on the current reference quality factor accuracy and the reference quality factor value received from the wireless power reception apparatus (S1306). Here, the foreign object detection reference quality threshold value may be determined by further considering the production and measurement tolerance for considering a design difference between transmitters.

The wireless power transmission apparatus may compare the pre-stored Measured_QF_Value with the FOD_QFT_Value and determine whether the foreign object is present in the charging area (S1307).

If the Measured_QF_Value is equal to or greater than the FOD_QFT_Value as the result of comparison, the wireless power transmission apparatus may determine that the foreign object is not present. If the Measured_QF_Value is less than the FOD_QFT_Value as the result of comparison, the wireless power transmission apparatus may determine that the foreign object is present.

Upon determining that the foreign object is not present in step 1307, the wireless power transmission apparatus may enter the phase transfer phase (S1308).

Upon determining that the foreign object is present in step 1307, the wireless power transmission apparatus may output a predetermined notification signal or notification message indicating that the foreign object has been detected and enter the selection phase (S1309).

Figure 14:
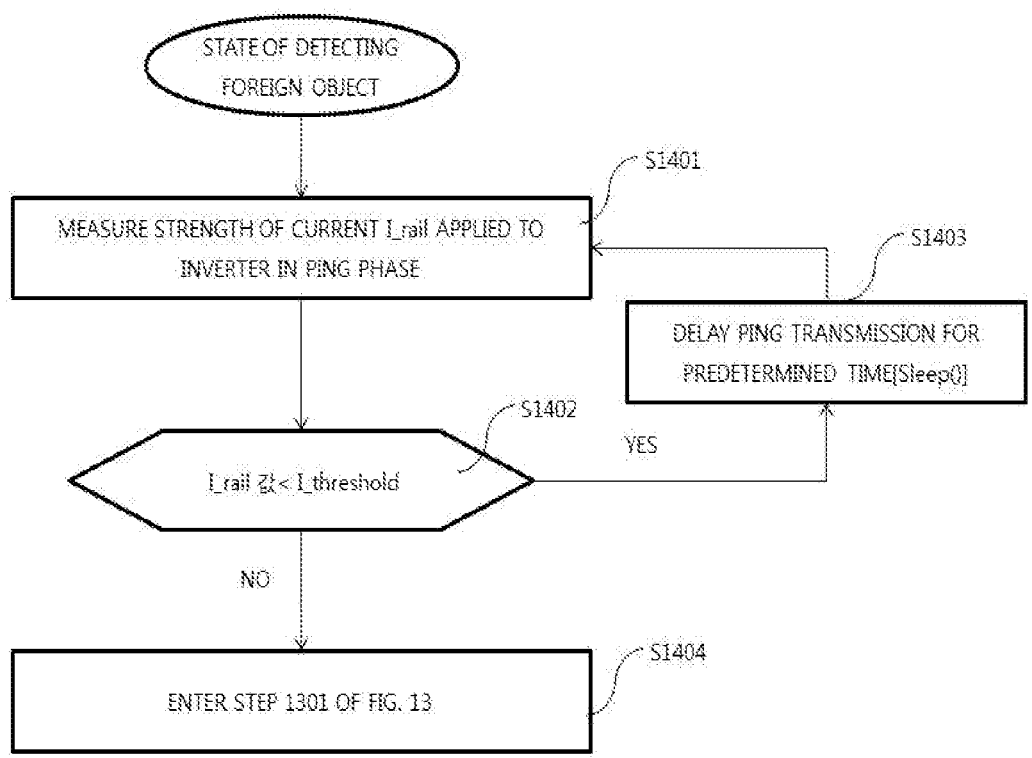
FIG. 14 is a flowchart illustrating operation of a wireless power transmission apparatus in a state of detecting a foreign object according to an embodiment.

FIG. 14 is a flowchart illustrating operation of a wireless power transmission apparatus in a state of detecting a foreign object according to an embodiment.

Referring to FIG. 14, upon entering the ping phase in a state in which the foreign object is detected, the wireless power transmission apparatus may measure the strength of the current I_rail applied to the inverter (S1401).

The wireless power transmission apparatus may compare the measured strength of I_rail with I_threshold and determine whether the detected foreign object is removed from the charging area (S1402).

If the measured I_rail value is equal to or greater than I_threshold as the result of comparison, the wireless power transmission apparatus may determine that the foreign object has been removed and enter step 1301 of FIG. 13 (S1404).

In contrast, if the measured I_rail value is less than I_threshold as the result of comparison, the wireless power transmission apparatus may determine that the foreign object is still present and delay ping signal transmission for a predetermined time (S1403). Therefore, the present disclosure can minimize unnecessary power waste and a heating phenomenon occurred by the foreign object when the foreign object is present.

Figure 15:
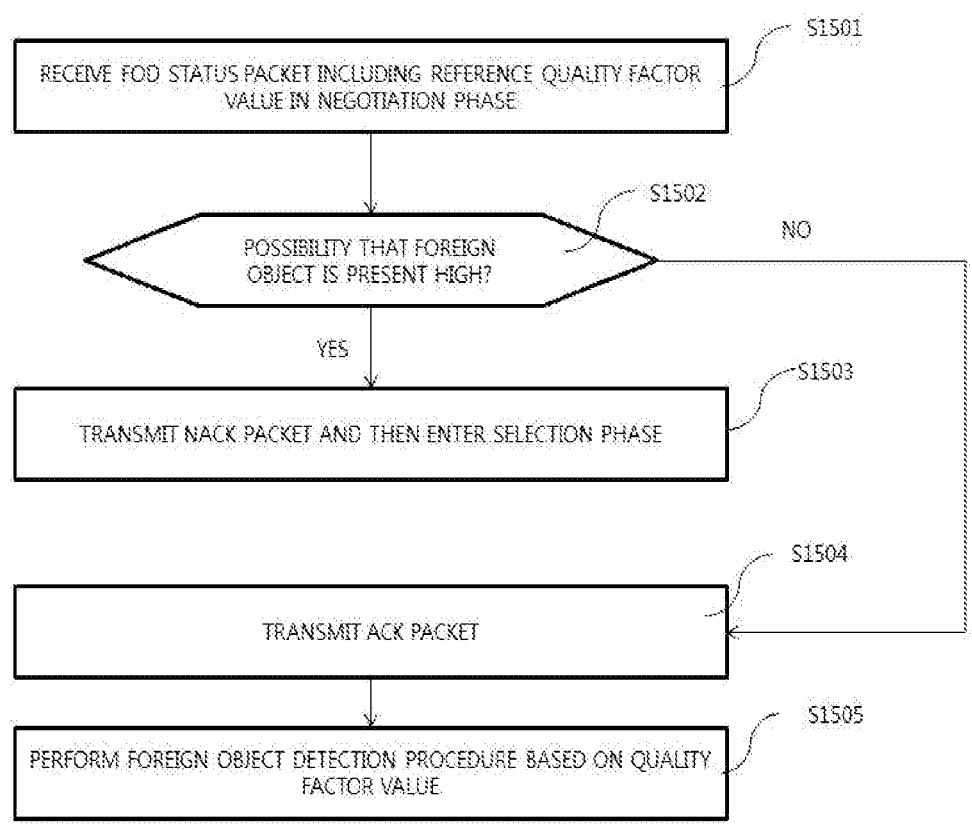
FIG. 15 is a flowchart illustrating an FOD method according to a possibility that a foreign object is present according to an embodiment.

FIG. 15 is a flowchart illustrating an FOD method according to a possibility that a foreign object is present according to an embodiment.

The wireless power transmission apparatus may receive the FOD status packet including the reference quality factor value in the negotiation phase (S1501).

The wireless power transmission apparatus may determine whether a possibility that the foreign object is present is high (S1502).

Upon determining that the possibility that the foreign object is present is high, the wireless power transmission apparatus may generate and transmit a NACK packet to the wireless power reception apparatus and then enter the selection phase (S1503).

Upon determining that the possibility that the foreign object is present is low in step 1502, the wireless power transmission apparatus may generate and transmit an ACK packet to the wireless power reception apparatus and then perform the foreign object detection procedure based on the quality factor value (S1504 to S1505).

Although the possibility that the foreign object is present may be determined by comparing the strength value of the current applied to the inductor of the wireless power transmission apparatus, that is, the I_rail value, with the predetermined inductor current threshold value I_rail threshold in the embodiment of FIG. 15, the present disclosure is not limited thereto. In another embodiment, the possibility that the foreign object is present may be determined by comparing the strength of current flowing in the transmission coil, that is, I_coil value, with the coil current threshold value I_coil threshold.

Figure 16:
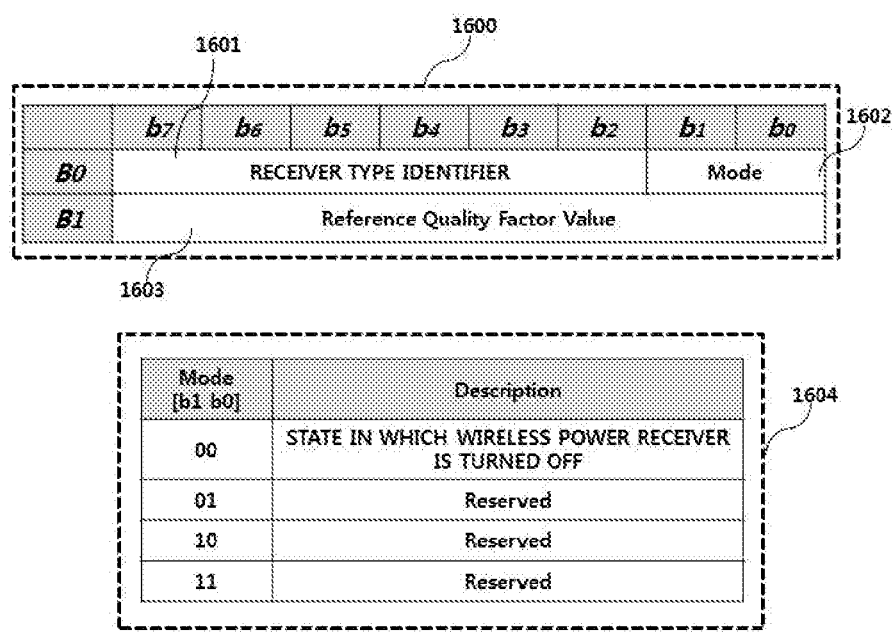
FIG. 16 is a view illustrating the structure of an FOD status packet message according to another embodiment.

FIG. 16 is a view illustrating the structure of an FOD status packet message according to another embodiment.

Referring to FIG. 16, the FOD status packet message may have a length of 2 bytes and include a receiver type identifier field 1601 having a length of 6 bits, a mode field 1602 having a length of 2 bits and a reference quality factor value field 1603 having a length of 1 byte. Although the length of the receiver type identifier field 1601 is shown as being 6 bits in FIG. 16, this is merely exemplary and it should be noted that the receiver type identifier field may have a length of less than 6 bits according to the design of those skilled in the art.

As denoted by reference numeral 1604, if the mode field 1602 is set to a binary number "00", this may mean that a reference quality factor value measured and determined in a state in which the wireless power receiver is powered off is recorded in the reference quality factor value field 1603.

FIG. 17 is a view illustrating the structure of a configuration packet message according to an embodiment.

As denoted by reference numeral 1701 of FIG. 17, the configuration packet message 1700 may have a length of 5 bytes, and include a power class field, a maximum power field, a power control field, a count field, a window size field, a window offset field and first to third reserved fields 1701 to 1703.

In the power class field, a power class allocated to the corresponding wireless power receiver may be recorded.

In the maximum power field, the strength value of maximum power capable of being provided by the output terminal of the rectifier of the wireless power receiver may be recorded.

For example, if the power class is a and the maximum power is b, the maximum power Pmax desired to be provided by the output terminal of the rectifier of the wireless power reception apparatus may be calculated as $(b/2)*10^a$.

The power control field may be used to indicate which algorithm is used to perform power control in the wireless power transmitter. For example, if the power control field value is 0, this may mean that a power control algorithm defined in the standard is applied and, if the power control field value is 1, this may mean that power control is performed according to an algorithm defined by a manufacturer.

The count field may be used to record the number of option configuration packets to be transmitted by the wireless power reception apparatus in the identification and the configuration phase.

The window size field may be used to record a window size for calculating average reception power. For example, the window size is a positive integer greater than 0 in units of 4 ms.

In the window offset field, information for identifying a time from an average reception power calculation window end time to a transmission start time of a next reception power packet may be recorded. For example, the window offset is a positive integer greater than 0 in units of 4 ms.

The above-described receiver type identifier may be recorded using at least one of the first to third reserved fields 1701 to 1703 of FIG. 17 and then transmitted to the wireless power receiver.

Here, the number of bits allocated for the receiver type identifier may vary according to the design of those skilled in the art and is not limited thereto.

FIG. 18 is a receiver type identifier mapping table in which a current change threshold value corresponding to a receiver type identifier is defined according to an embodiment.

Referring to FIG. 18, the receiver type identifier field has a length of 6 bits and has a range from 0 to 63.

As shown in FIG. 18, the unit of the current change threshold value is mA, and the current change threshold value increases by 100 mA as the type identifier increases by one. However, this is merely exemplary and the current change threshold corresponding to the receiver type identifier may vary according to the design of those skilled in the art. For example, the current change threshold value may increase by 50 mA as the type identifier increases by one.

In addition, although the length of the receiver type field is 6 bits in the embodiment of FIG. 16, this is merely exemplary, and the length of the receiver type field may be greater or less than 6 bits.

As a result of a preliminary experiment on a wireless power receiver A, change in current measured when the wireless power receiver A is located in the charging area is 600 mA, the receiver type identifier corresponding to the wireless power receiver A may be allocated a binary number "000101". For example, the wireless power receiver may transmit the receiver type identifier allocated thereto to the wireless power transmitter through the configuration packet in the configuration and identification phase. In another example, the wireless power receiver may transmit the receiver type identifier allocated thereto to the wireless power transmitter through the FOD status packet.

FIG. 19 is a receiver type identifier mapping table in which a current change threshold ratio corresponding to a receiver type identifier is defined according to another embodiment.

Referring to FIG. 19, the receiver type identifier has a length of 2 bits, and the current change threshold ratio may be defined as a ratio of the current value of a digital ping signal measured when the wireless power receiver is not placed in the charging area (hereinafter, for convenience of description, referred to as an initial inverter input current value Initial_Inverter_Input_Current_Value) to the current value of the digital ping signal measured after the wireless power receiver is placed in the charging area Measured_Inverter_Input_Current_Value, that is, an inverter input current strength value.

For example, the current change ratio in the ping phase may be calculated by:

{(Measured_Inverter_Input_Current_Value−Initial_Inverter_Input_Current_Value)/(Initial_Inverter_Input_Current_Value)}*100. If the current change ratio corresponding to a specific wireless power receiver is 80, the receiver type identifier corresponding to the wireless power receiver may be defined as a binary number "10" as shown in FIG. 15.

Although the receiver type identifier has a length of 2 bits and the current change threshold ratio corresponding to each receiver type identifier has a range of 20% in the embodiment of FIG. 19, this is merely exemplary, and the allocation range of the current change threshold ratio corresponding to each receiver type identifier and the length of the receiver type identifier may vary according to the design of those skilled in the art and the applied apparatus and system.

Figure 20:
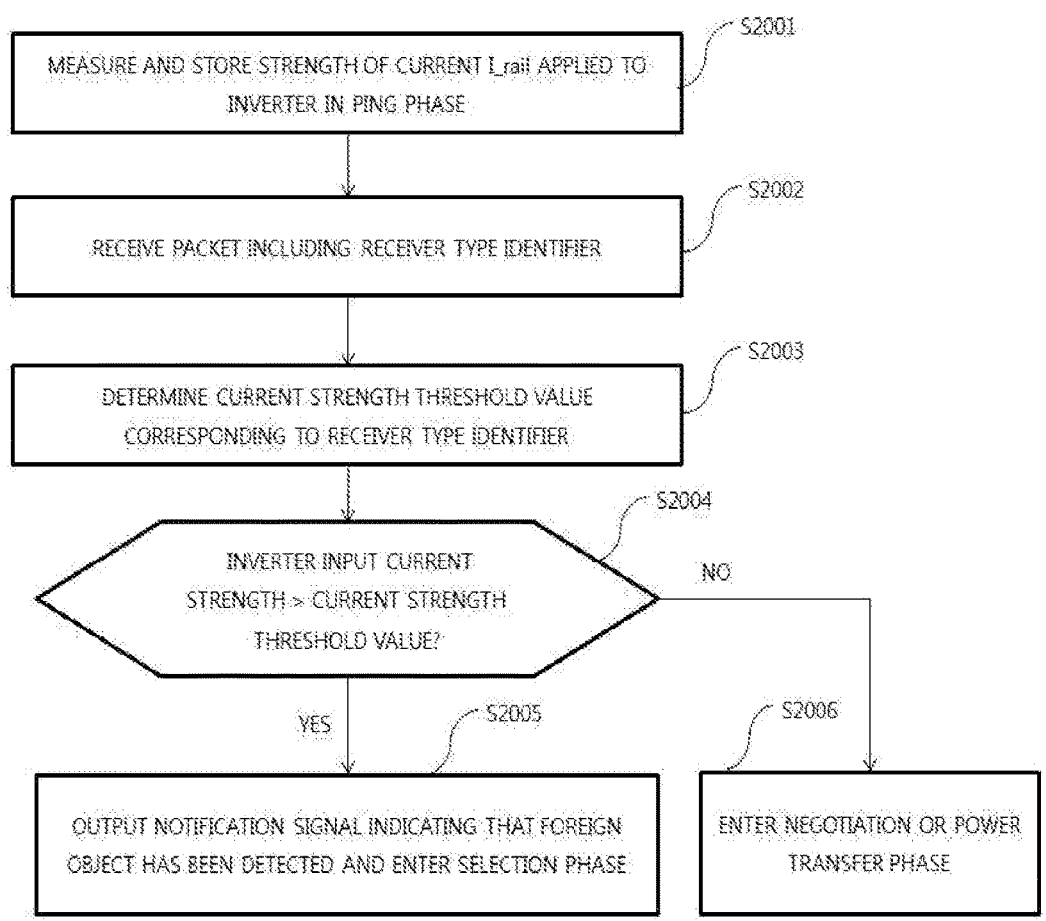
FIG. 20 is a flowchart illustrating a foreign object detection method in a wireless power transmission apparatus according to another embodiment.

FIG. 20 is a flowchart illustrating a foreign object detection method in a wireless power transmission apparatus according to another embodiment.

Referring to FIG. 20, the wireless power transmission apparatus may measure the strength of the current applied to the inverter in the ping phase and store information on the measured inverter input current strength in a predetermined recording region (S2001).

The wireless power transmission apparatus may receive a packet including the receiver type identifier (S2002). Although the receiver type identifier may be received through the configuration packet in the configuration and identification phase, this is merely exemplary. In another embodiment, the receiver type identifier may be received through the FOD status packet in the negotiation phase.

The wireless power transmission apparatus may determine a current strength threshold value corresponding to the receiver type identifier (S2003). The current strength threshold may be determined by referring to the receiver type identifier mapping table described with reference to FIG. 18 or 19, without being limited thereto.

The wireless power transmission apparatus may compare the inverter input current strength stored in step 2001 with the current strength threshold value to determine whether the foreign object is present in the charging area (S2004). For example, if the inverter input current strength exceeds the current strength threshold value, the wireless power transmission apparatus may determine that the foreign object is present in the charging area. In contrast, if the inverter input current strength is less than or equal to the current strength threshold value, it may be determined that the foreign object is not present in the charging area.

Upon determining that the foreign object is present, the wireless power transmission apparatus may output a predetermined notification signal indicating that the foreign object has been detected and then enter the selection phase 510 (S2005).

Upon determining that the foreign object is not present in step S2004, the wireless power transmission apparatus may enter the negotiation phase or the power transfer phase (S2006).

Figure 21:
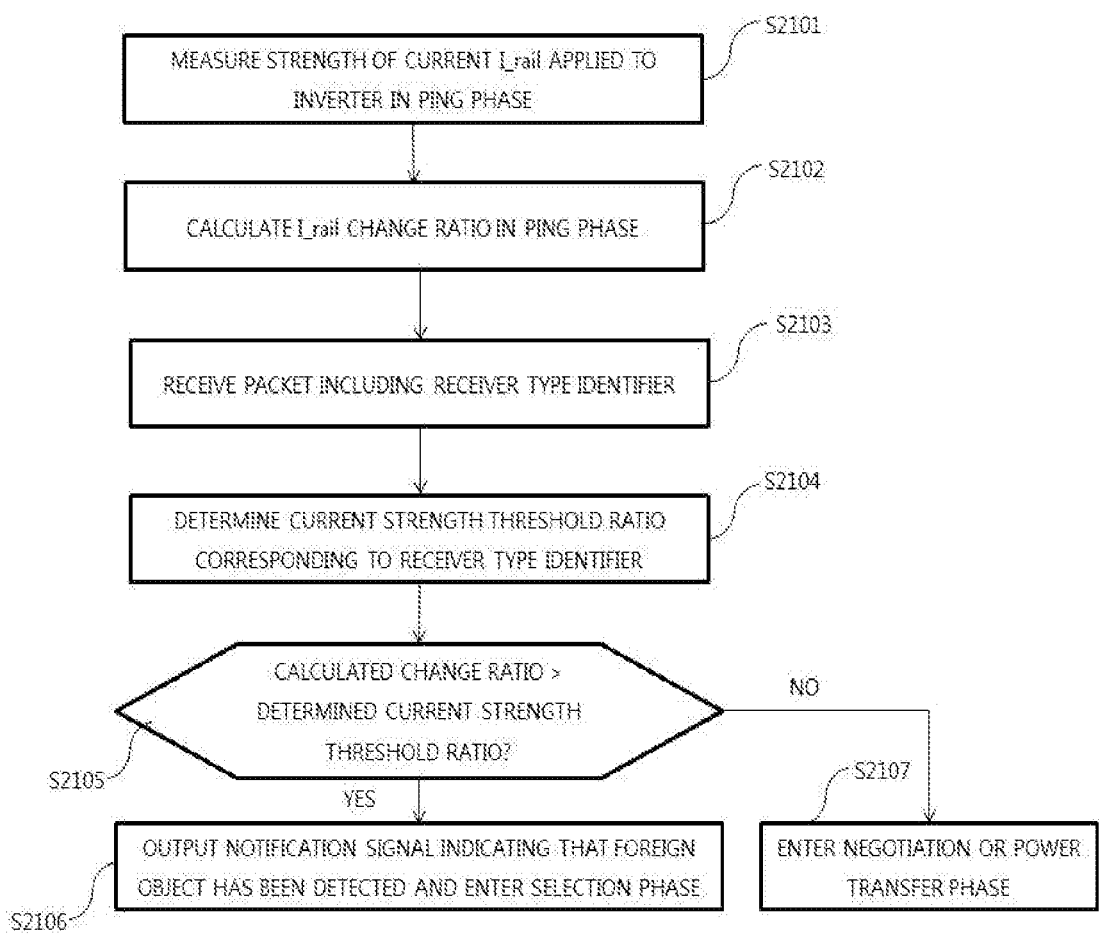
FIG. 21 is a flowchart illustrating a foreign object detection method in a wireless power transmission apparatus according to another embodiment.

FIG. 21 is a flowchart illustrating a foreign object detection method in a wireless power transmission apparatus according to another embodiment.

Referring to FIG. 21, the wireless power transmission apparatus may measure the strength of the current applied to the inverter in the ping phase and store information on the measured inverter input current strength Measured_I_Rail in a predetermined recording region (S2101).

The wireless power transmission apparatus may calculate a change ratio of the inverter input current I_rail using information on the strength of the current input to the inverter in a state in which the object is not detected, that is, information on the initial inverter input current value Initial_Inverter_Input_Current_Value, and information on the inverter input current value Measured_Inverter_Input_Current_Value measured in the ping phase (S2102). The change ratio of the inverter input current may be calculated by {(Measured_Inverter_Input_Current_Value−Initial_Inverter_Input_Current_Value)/(Initial_Inverter_Input_Current_Value)}*100.

The wireless power transmission apparatus may receive the packet including the receiver type identifier (S2103). Although the receiver type identifier may be received through the configuration packet in the configuration and identification phase, this is merely exemplary. In another embodiment, the receiver type identifier may be received through the FOD status packet in the negotiation phase.

The wireless power transmission apparatus may determine a current strength threshold ratio corresponding to the receiver type identifier (S2104). The current strength threshold ratio may be determined by referring to the receiver type identifier mapping table described with reference to FIG. 15, without being limited thereto.

The wireless power transmission apparatus may compare the inverter input current change ratio calculated in step 2102 with the current strength threshold ratio to determine whether the foreign object is present in the charging area (S2105). For example, if the inverter input current change ratio exceeds the current strength threshold ratio, the wireless power transmission apparatus may determine that the foreign object is present in the charging area. In contrast, if the inverter input current change ratio is equal to or less than the current strength threshold ratio, it may be determined that the foreign object is not present in the charging area.

Upon determining that the foreign object is present, the wireless power transmission apparatus may output a predetermined notification signal indicating that the foreign object has been detected and then enter the selection phase 510 (S2106).

Upon determining that the foreign object is not present in step S2105, the wireless power transmission apparatus may enter the negotiation phase or the power transfer phase (S2107).

Figure 22:
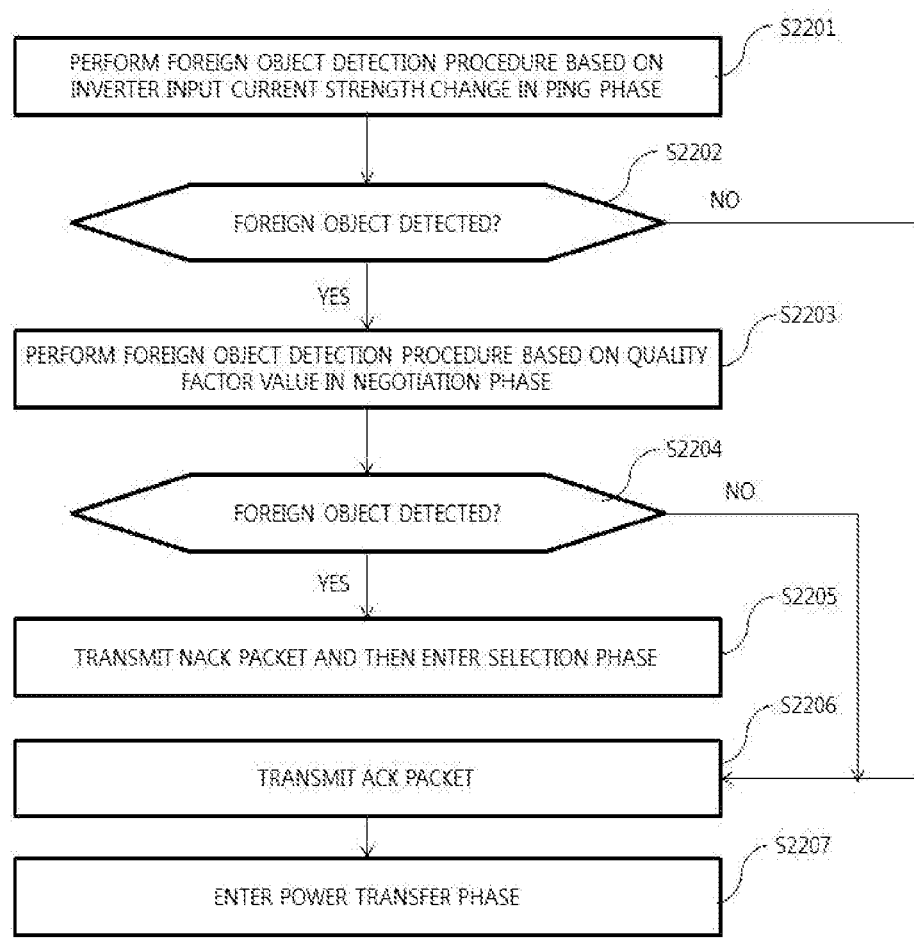
FIG. 22 is a flowchart illustrating a foreign object detection method in a wireless power transmission apparatus according to another embodiment.

FIG. 22 is a flowchart illustrating a foreign object detection method in a wireless power transmission apparatus according to another embodiment.

Referring to FIG. 22, the wireless power transmission apparatus may perform a foreign object detection procedure based on inverter input current strength change in the ping phase (S2201).

The wireless power transmission apparatus may determine whether the foreign object is present through the foreign object detection procedure based on the inverter input current strength change (S2202). Upon determining that the foreign object is present, the foreign object detection procedure based on the quality factor value may be performed in the negotiation phase (S2203). At this time, the wireless power transmission apparatus may calibrate the reference quality factor accuracy used to determine the quality factor threshold value. For example, the reference quality factor accuracy may be adjusted from +/−10% to +/−5%, thereby more accurately detecting the foreign object.

The wireless power transmission apparatus may perform the foreign object detection procedure based on the quality factor value in the negotiation to determine whether the foreign object is present (S2204). Upon determining that the foreign object is present, the wireless power transmission apparatus may transmit a NACK packet and then enter the selection phase 510 (S2205). In contrast, upon determining that the foreign object is not present in step 1804, the wireless power transmission apparatus may transmit an ACK packet (S2206) and enter the power transfer phase to start charging (S2207).

Upon determining that the foreign object is not present in step 2202, the wireless power transmission apparatus may not perform the foreign object detection procedure based on the quality factor value and may perform step 2206. At this time, the wireless power transmission apparatus may generate and transmit the ACK packet to the wireless power receiver after receiving the FOD status packet in the negotiation phase.

Figure 23:
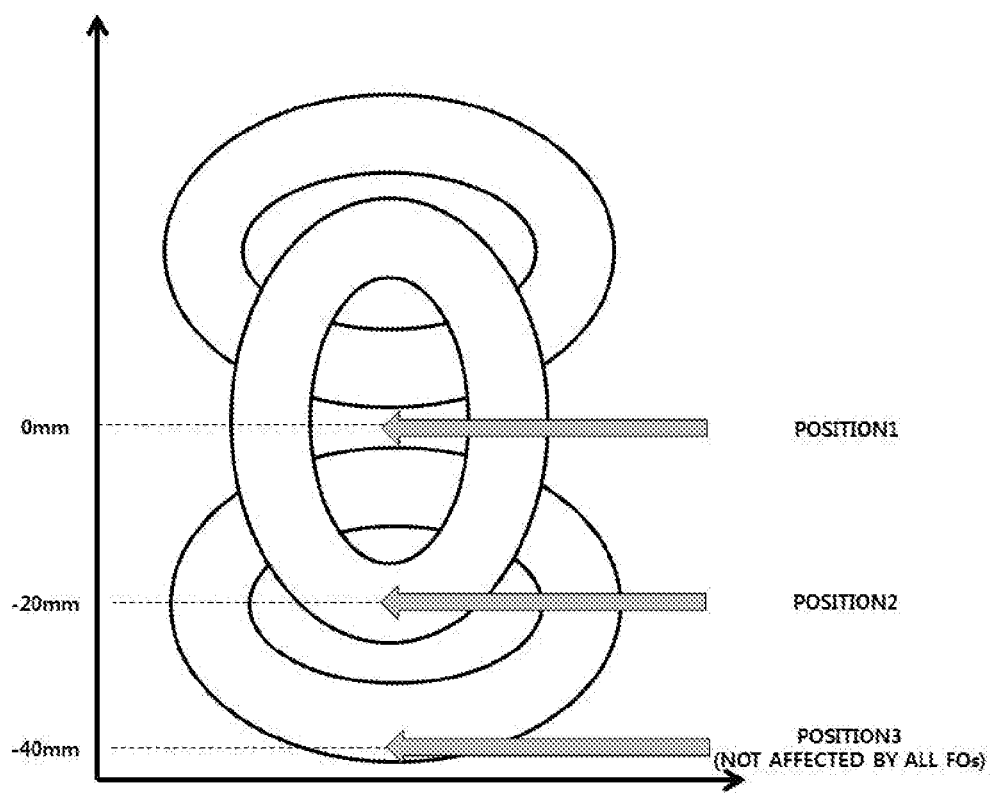
FIG. 23 is a view showing a transmission coil installed in a wireless power transmission apparatus according to an embodiment.

FIG. 23 is a view showing a transmission coil installed in a wireless power transmission apparatus according to an embodiment.

Figure 24A:
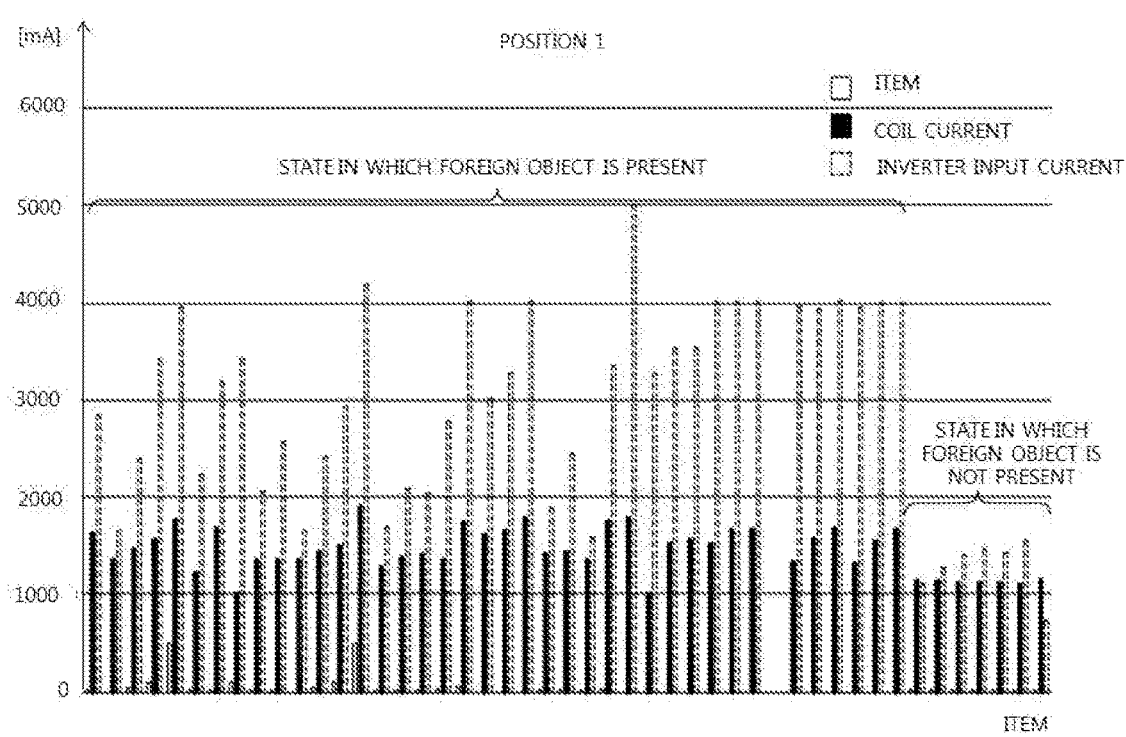
FIGS. 24a to 24b are graphs showing the result of measuring an inductor input current strength and a transmission coil input current strength according to the position of the transmission coil shown in FIG. 23.
Figure 24B:
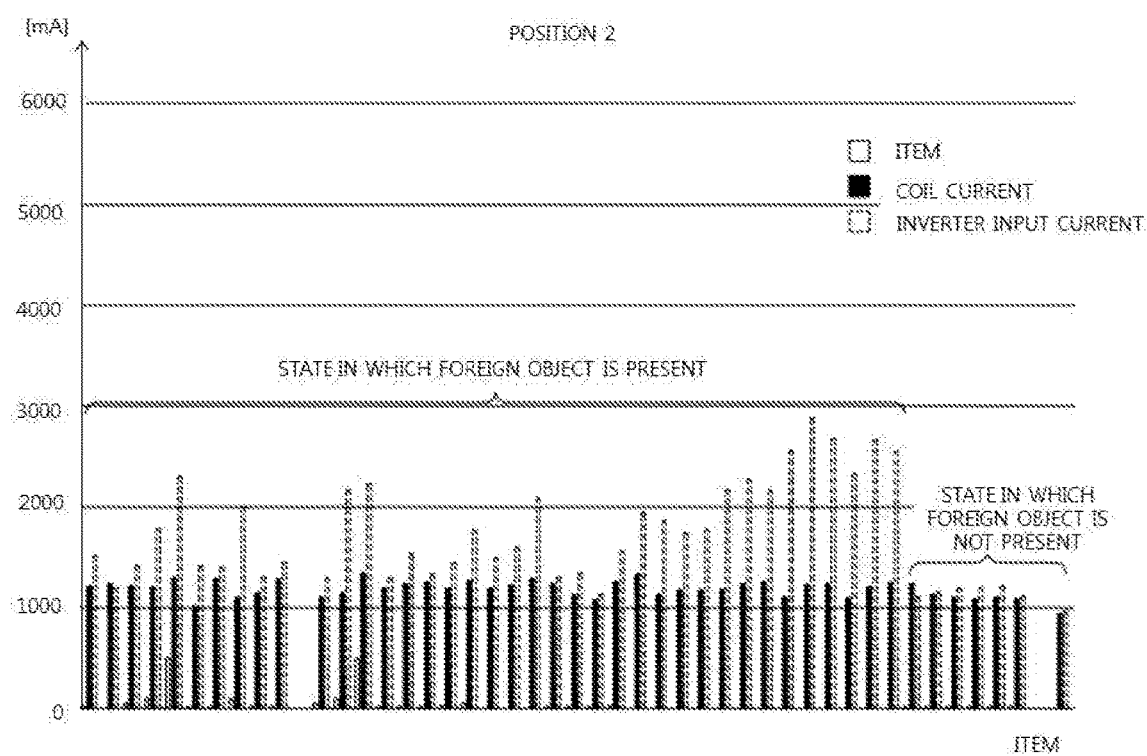

Referring to FIG. 23, the wireless power transmission apparatus may include three transmission coils, and the three transmission coils may be disposed such that certain regions thereof overlap. As shown in FIG. 23, if foreign objects are present at Position 1 which is the center of the transmission coil block and position 2 spaced apart therefrom by 20 mm, as shown in FIGS. 24a to 24b, the strength of the inverter input current may be changed. Change in inverter input current according to all foreign objects is not large at Position 3 spaced apart from the center of the transmission coil block by 40 mm.

FIGS. 24a to 24b are graphs showing the result of measuring an inductor input current strength and a transmission coil input current strength according to the position of the transmission coil in a state in which the transmission coils are arranged as shown in FIG. 23.

FIG. 24a shows the result of measuring the inductor input current strength and the transmission coil input current strength according to the type of the foreign object at Position 1 of FIG. 23.

FIG. 24b shows the result of measuring the inductor input current strength and the transmission coil input current strength according to the type of the foreign object at Position 2 of FIG. 23.

Referring to FIGS. 24a and 24b, it can be seen that the strength of the current measured at Position 1 is greater than that of the current measured at Position 2.

Referring to FIGS. 24a and 24b, it can be seen that the strength of the current measured in a state in which the foreign object is not present upon ping transmission is greater than that of the current measured in a state in which the foreign object is present.

In particular, it can be seen that, if the state in which the foreign object is not present is changed to the state in which the foreign object is present, the strength change of the inverter input current is greater than that of the transmission coil current.

Figure 25:
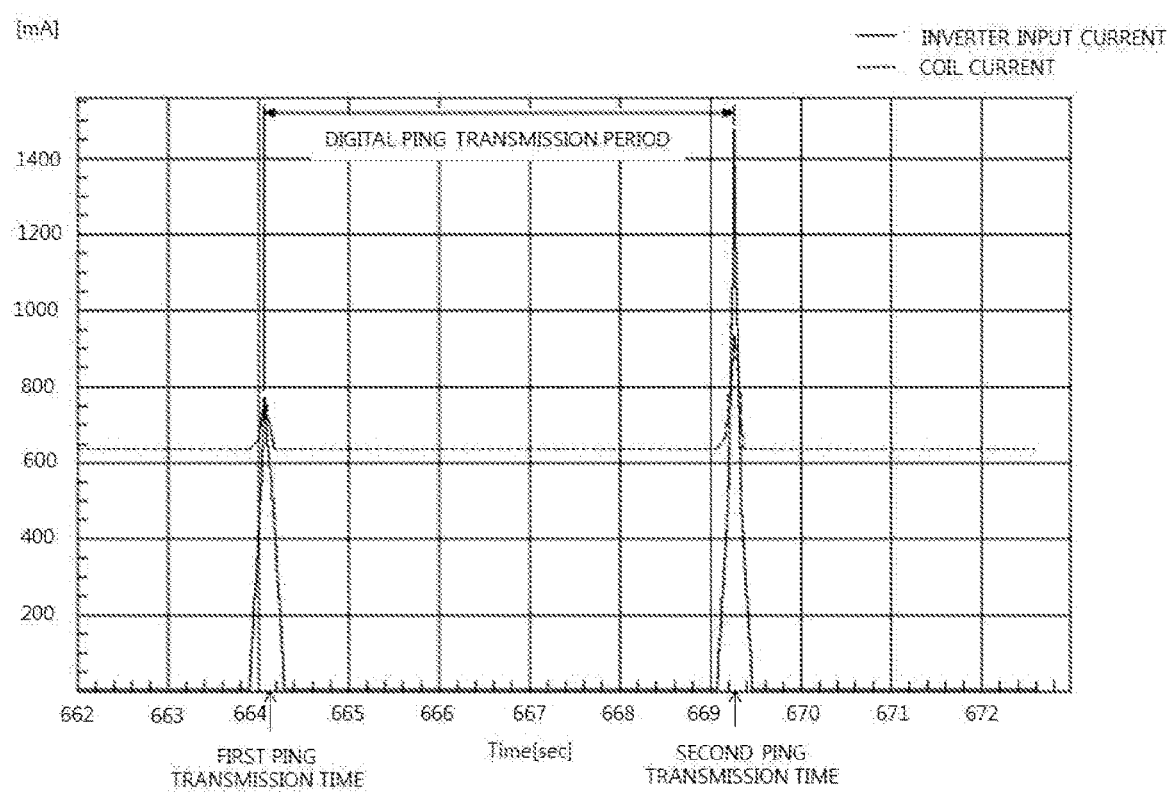
FIGS. 25 to 26 are views showing change patterns of coil current and inverter input current when a foreign object is located in a charging area corresponding to Position 1 of FIG. 23 in a ping phase.
Figure 26:
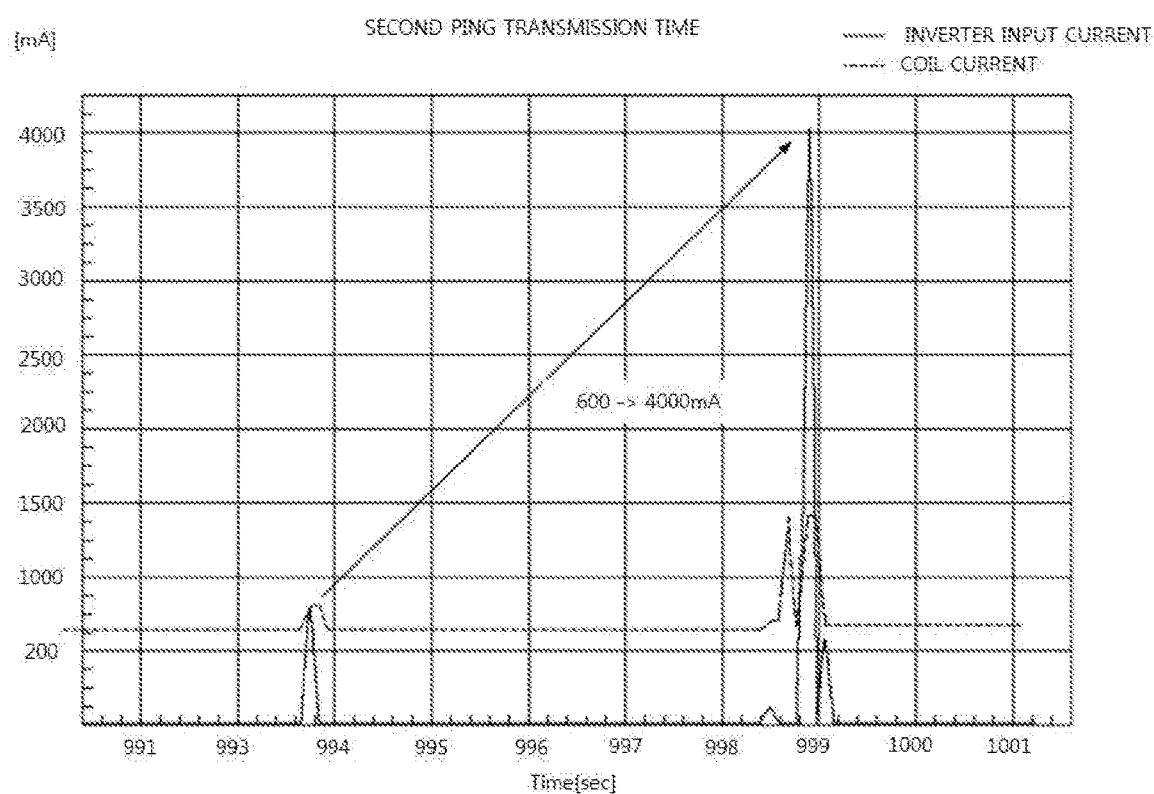

FIGS. 25 to 26 show the change pattern of the coil current and the inverter input current in the ping phase when the foreign object is located at Position 1 in the charging area of FIG. 23.

FIG. 25 shows an experimental result when the foreign object is a 10-won coin and FIG. 26 shows an experimental result when the foreign object is a 500-won coin.

The graph shown in FIG. 25 shows that change in coil current and inverter input current at a first ping transmission time in a state in which the foreign object is not located in the charging area is several tens of mA, but change in coil current and inverter input current at a second ping transmission time in a state in which the foreign object is located in the charging area is several hundred mA.

Referring to FIG. 26, if the foreign object is a 500-won coin, change in coil current and inverter input current at a second ping transmission time in a state in which the foreign object is located in the charging area is several thousand mA.

The method according to the foregoing embodiments may be implemented as code that can be written to a computer-readable recording medium and can thus be read by a computer. Examples of the computer-readable recording medium include a ROM, a RAM, a CD-ROM, a magnetic tape, a floppy disk, an optical data storage, and a carrier wave (e.g., data transmission over the Internet).

The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Those skilled in the art will appreciate that the disclosure may be carried out in other specific ways than those set forth herein without departing from the spirit and essential characteristics of the disclosure.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The disclosure is available in a wireless charging field and, more particularly, is applicable to a wireless power transmitter having a foreign object detection function and a wireless charging system including the same.

The invention claimed is:

1. A method of detecting a foreign object in a wireless power transmitter, the method comprising:
   measuring a strength of current input to an inverter in a ping phase;
   receiving a packet including a receiver type identifier from a specific first wireless power receiver;
   referring to a mapping table mapping a plurality of receiver type identifiers with a plurality of threshold values to determine a specific first threshold value among the plurality of threshold values corresponding to the specific first wireless power receiver;
   comparing the measured strength of the current with the specific first threshold value;
   determining the foreign object is present when the measured strength of the current is greater than the specific first threshold value; and
   determining the foreign object is not present when the measured strength of the current is not greater than the specific first threshold value.

2. The method according to claim 1, wherein the receiver type identifier is included and received in any one of a configuration packet received in a configuration and identification phase and a foreign object detection (FOD) status packet received in a negotiation phase.

3. The method according to claim 1, further comprising:
   entering a negotiation phase or a power transfer phase upon determining that the foreign object is not present.

4. The method according to claim 1, further comprising performing a foreign object detection procedure based on a quality factor value upon determining that the foreign object is present,
   wherein, it is determined whether the foreign object is present, through not only the comparing of the measured strength of the current with the specific first threshold value but also the foreign object detection procedure based on the quality factor value, and
   wherein a NACK packet is transmitted to a wireless power receiver, upon determining that the foreign object is present through the foreign object detection procedure based on the quality factor value, and an ACK packet is transmitted to the wireless power receiver, upon determining that the foreign object is not present through the foreign object detection procedure based on the quality factor value.

5. The method according to claim 1, further comprising:
   receiving a foreign object detection (FOD) status packet in a negotiation phase and then transmitting an ACK packet to the specific wireless power receiver, upon determining that the foreign object is not present.

6. A method of detecting a foreign object in a wireless power transmitter, the method comprising:
   calculating a change ratio of current input to an inverter in a ping phase;
   receiving a packet including a receiver type identifier from a specific wireless power receiver;
   referring to a mapping table mapping a plurality of receiver type identifiers with a plurality of current strength threshold values to determine a specific current strength threshold value among the plurality of current strength threshold values corresponding to the specific wireless power receiver;
   comparing the calculated change ratio of the current with the specific current strength threshold value;
   determining the foreign object is present when the calculated change ratio of the current is greater than the specific current strength threshold value; and
   determining the foreign object is not present when the calculated change ratio of the current is not greater than the specific current strength threshold value.

7. The method according to claim 6, wherein the change ratio of the current input to the inverter is calculated by a ratio of an initial inverter input current strength value when the foreign object is not detected to an inverter input current strength value measured in the ping phase.

8. The method according to claim 6, wherein the receiver type identifier is included and received in any one of a configuration packet in a configuration and identification phase and a foreign object detection (FOD) status packet in a negotiation phase.

9. The method according to claim 6, further comprising:
   entering a negotiation phase or a power transfer phase upon determining that the foreign object is not present.

10. A foreign object detection apparatus comprising:
    an inverter converting DC power to AC power;
    a sensor measuring a strength of current input to the inverter in a ping phase;

a demodulator receiving a packet including a receiver type identifier from a specific wireless power receiver; and a controller:
referring to a mapping table mapping a plurality of receiver type identifiers with a plurality of threshold values to determine a specific threshold value among the plurality of threshold values corresponding to the specific wireless power receiver;
comparing the measured strength of the current with the specific threshold value;
determining the foreign object is present when the measured strength of the current is greater than the specific threshold value; and
determining the foreign object is not present when the measured strength of the current is not greater than the specific threshold value.

11. The apparatus according to claim 10, further comprising:
a DC-DC converter converting a DC power applied from a power source into a specific DC power, and applying the specific DC power to the inverter,
wherein the sensor measures an intensity of current flowing between the DC-DC converter and the inverter.

12. The apparatus according to claim 11, further comprising:
an LC resonance circuit including an inductor and a resonance capacitor connected in series for wirelessly transmitting the AC power.

13. The apparatus according to claim 10, wherein the receiver type identifier is included and received in any one of a configuration packet received in a configuration and identification phase and a foreign object detection (FOD) status packet received in a negotiation phase.

14. The apparatus according to claim 10, wherein the controller controls to enter a negotiation phase or a power transmission phase when the controller determines that the foreign object is not present.

15. The apparatus according to claim 10, wherein the controller performs a foreign object detection procedure based on a quality factor value upon determining that the foreign object is present, wherein, it is determined whether the foreign object is present, through not only the comparing of the measured strength of the current with the specific threshold value but also the foreign object detection procedure based on the quality factor value, and wherein the controller transmits a NACK packet to a wireless power receiver, upon determining that the foreign object is present through the foreign object detection procedure based on the quality factor value, and transmits an ACK packet to the wireless power receiver, upon determining that the foreign object is not present through the foreign object detection procedure based on the quality factor value.

16. The apparatus according to claim 10, wherein the controller transmits an ACK packet to the specific wireless power receiver after receiving a foreign object detection (FOD) status packet in a negotiation phase when the controller determines that the foreign object is not present.

17. The method according to claim 1, wherein the specific threshold values in the mapping table are experimentally premeasured threshold values with no foreign object present.

18. The method according to claim 1, wherein the plurality of receiver type identifiers correspond to different wireless power receivers and the plurality of threshold values correspond to different threshold values of the different wireless power receivers.

19. The method according to claim 1, further comprising:
receiving a packet including a receiver type identifier from a specific second wireless power receiver;
referring to the mapping table to determine a specific second threshold value among the plurality of threshold values corresponding to the specific second wireless power receiver;
comparing the measured strength of the current with the specific second threshold value;
determining the foreign object is present when the measured strength of the current is greater than the specific second threshold value; and
determining the foreign object is not present when the measured strength of the current is not greater than the specific second threshold value.

* * * * *